United States Patent [19]
Tanaka et al.

[11] Patent Number: 5,764,216
[45] Date of Patent: Jun. 9, 1998

[54] GAMMA CORRECTION CIRCUIT, A LIQUID CRYSTAL DRIVER, A METHOD OF DISPLAYING IMAGE, AND A LIQUID CRYSTAL DISPLAY

[75] Inventors: Katsunori Tanaka; Mikio Oshiro; Tosiya Onodera; Katsuhiko Kishida; Masaki Miyahara, all of Kanagawa, Japan

[73] Assignee: Fujitsu Limited, Kawasaki, Japan

[21] Appl. No.: 268,774

[22] Filed: Jun. 29, 1994

[30] Foreign Application Priority Data

Jun. 30, 1993 [JP] Japan .................. 5-160713
Mar. 18, 1994 [JP] Japan .................. 6-049526

[51] Int. Cl.⁶ .................................... H04N 5/21
[52] U.S. Cl. ........................... 345/147; 348/674
[58] Field of Search ...................... 345/147, 143, 345/145, 142, 87; 348/673, 674

[56] References Cited

U.S. PATENT DOCUMENTS 4,388,621  6/1983  Komotsu et al.
5,151,689  9/1992  Kabuto et al. .................. 345/103
5,325,195  6/1994  Ellis et al. ...................... 348/189
5,408,267  4/1995  Main .............................. 348/254

*Primary Examiner*—Mark R. Powell
*Attorney, Agent, or Firm*—Greer, Burns & Crain, Ltd.

[57] ABSTRACT

The present gamma correction circuit is provided with a memory for supplying correction data for the gamma correction of the luminance of a display means, and a selector for selecting either from N-bit uncorrected digital display data and corrected data for outputting as driving data for the display means. A liquid crystal driver is provided with gamma correction means for gamma-correcting the luminance of a liquid crystal panel inputting the N-bit digital display data for liquid crystal displaying and means for converting the N-bit digital display data into analog data, the gamma correction means comprises a gamma correction circuit of the invention. A liquid crystal display device is provided with a liquid crystal display panel inputting the N-bit digital display data for liquid crystal displaying, and gamma correction means or a liquid crystal driver for gamma-correcting the luminance of the liquid crystal display panel. The gamma correction means or the liquid crystal driver comprises a gamma correction means or a liquid crystal driver of the present invention.

34 Claims, 17 Drawing Sheets

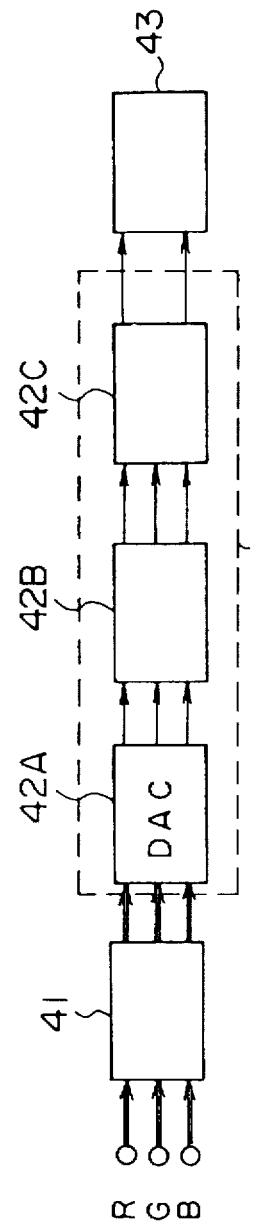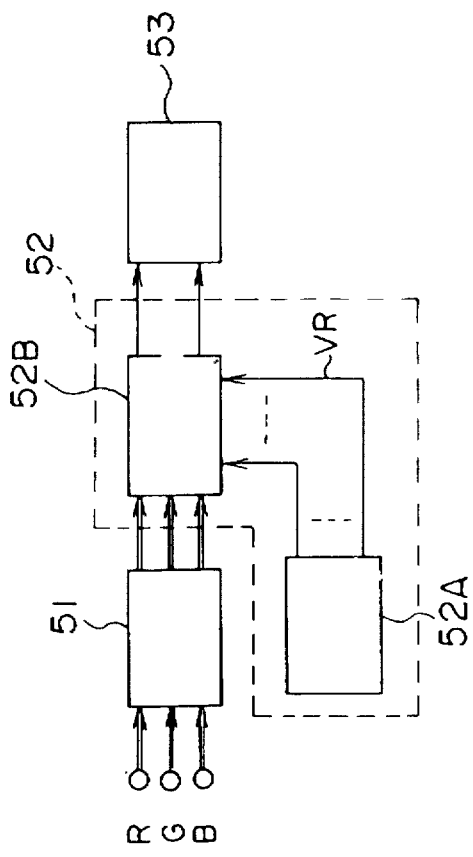

GAMMA CORRECTION CIRCUIT, A LIQUID CRYSTAL DRIVER, A METHOD OF DISPLAYING IMAGE, AND A LIQUID CRYSTAL DISPLAY

BACKGROUND OF THE INVENTION

1. Field of the Invention

The invention relates to a gamma correction circuit, a liquid crystal display driver, a method of image display, and a liquid crystal display (hereinafter, referred to as "LCD") device. More particularly, the invention relates to a circuit for gamma-correcting the luminance of a liquid crystal display panel and improvements of its driving functions.

2. Description of the Related Art

Recently, a higher display quality is required even in color LCD's with the enhancement of performance of portable computers. Also, all sorts of display devices and video cameras, etc. need a circuit for the gamma correction of the luminance of image signals. Therefore, gamma correction circuits suitable for the improvement of display quality has been developed for higher performance of their application device.

In such gamma correction circuits, a method is used in which reference data stored in, e.g., read only memory (ROM) are read out using input data as its address. Generally, the relation between the voltage applied to a liquid crystal display panel and its transmissivity is nonlinear. And, the number of pixels is increasing as display screens increase in size and full-color LCD's come to be used.

It will be useful to explain the prior art of the invention. For example, a gamma correction circuit for such an LCD as found in Patent Application Disclosure No. 232449 issued by the Patent Office of Japan in 1993 is provided with a reference data table 1 for correction, a correction attribute data table 2, an arithmetic unit 3, a selection signal generator 4 and a selector 5 as shown in FIG. 1. For each of the tables 1 and 2, ROM's of the CMOS type are used in order to reduce the power consumption.

In the operation of the above gamma correction circuit, when input data DI is supplied to the data tables 1 and 2, reference data DR is output by the data table 1 using the data DI as its address to the selector 5 and the arithmetic unit 3, and correction attribute data DX is output by the data table 2 using the data DI as its address to the selection signal generator 4. The reference data DR is used for the calculation in the arithmetic unit 3 which receives, e.g., an arithmetic control signal SA, and is output to the selector 5 as its corrected data. The calculation is intended for the gamma correction of the driving voltage-transmissivity characteristic of a LCD panel (hereinafter, referred to as "the photo-transmissive characteristic of crystals").

On the other hand, the selection signal generator 4 inputs the correction attribute data DX and a gray scale pattern SP and generates a selector control signal SS to supply it to the selector 5, which, on the reception of the control signal SS, outputs either a reference data DR or a corrected data DA to the following liquid crystal driver.

SUMMARY OF THE INVENTION

It is an object of the invention to separately gamma-correct a part considered to be substantially linear in the transmissive characteristic of display means and an inclined part in it for a higher speed and the cost reduction of data processing.

It is a further object of the invention to gamma-correct display data of multiple gray scale with a small number of latches by easily forming a data selecting means using logic gates for reducing the consumption of electric power.

It is yet another object of the invention to reduce the consumption of electric power through the application of a gamma correction circuit of the invention even when the number of pixels of the display is increased and data transfer frequency is raised.

A principle gamma correction circuit according to the invention, as shown in one preferred mode of FIG. 2, is provided with a memory for supplying correction data for the gamma correction of the luminance of a display means, and a selector for selecting either from N-bit uncorrected digital display data and corrected data for outputting as driving data for the display means.

Specifically, a first gamma correction circuit comprises: a memory for storing the correction data including the first correction data for correcting substantially linear part of the photo-transmissive characteristic of display means and the second correction data for correcting the part other than the substantially linear part of the photo-transmissive characteristic; a first latch circuit for extracting the first correction data from the correction data; a second latch circuit for extracting the second correction data from the correction data; a control signal generator for generating a selection control signal on the basis of N-bit digital display data and the correction data; a selector for selecting one out of the N-bit digital display data and the second correction data on basis of the selection control signal; and a calculator for making the first correction data operate on one of the selected digital display data and second correction data.

In the first gamma correction circuit, the second latch circuit further includes a selector for selecting the second correction data for correcting the part other than the substantially linear part of the photo-transmissive characteristic of the display means from the correction data; and a latch circuit for holding the second correction data.

The control signal generator comprises: a latch circuit for holding the correction data for gamma-correcting the luminance of display means; and a comparator for comparing the correction data and N-bit digital display data.

A second gamma correction circuit comprises: a control signal generator for generating a latch control signal and an address on the basis of a reference signal; a memory for storing correction data which be read out on the basis of the address; a latch circuit for latching the correction data on the basis of the latch control signal generated by the control signal generator; and a selector for selecting the correction data on the basis of N-bit digital display data.

In the second gamma correction circuit, the selector includes an asynchronous selector and is formed of CMOS logic gates. The memory has a part of its addresses allocated for the correction data and the rest of the addresses allocated for parameters.

A first liquid crystal driver comprises: a memory for supplying correction data for gamma-correcting the luminance of a liquid crystal display panel; a selector for selecting one out of uncorrected N-bit digital display data and the correction data and supplying the selected one as driving data for the liquid crystal display panel; and means for converting the driving data supplied by the selector into an analog signal.

A second liquid crystal driver comprises: a control signal generator for generating a latch control signal and an address on the basis of a reference signal; a memory for storing correction data which be read out on basis of the address; a latch circuit for latching the correction data on the basis of the latch control signal generated by the control signal generator; a selector for selecting the correction data on the basis of N-bit digital display data; and means for converting data supplied by the selector into an analog signal.

A first image display method has the steps of: selecting either uncorrected N-bit digital display data or correction data for gamma-correcting the luminance of display means; and supplying the digital display data as driving data for the display means.

A second image display method has the steps of: extracting first correction data for correcting the substantially linear part of the photo-transmissive characteristic curve of display means and second correction data for correcting the parts other than the substantially linear part of the photo-transmissive characteristic curve of the display means individually from the correction data for gamma-correcting the luminance of the display means; selecting either N-bit digital display data or the second correction data; performing arithmetic operation on the digital display data or the second correction data with the first correction data; and supplying the digital display data as the driving data for the display means.

A third image display method has the steps of: generating a latch control signal and addresses on the basis of the receipt of a reference signal; reading correction data for gamma-correcting the luminance of display means on the basis of the receipt of the addresses; holding the correction data on the basis of the receipt of the latch control signal; and selecting and supplying the correction data in response to N-bit digital display data.

A liquid crystal display comprises: a liquid crystal driver for gamma-correcting the luminance of a liquid crystal display panel on the basis of N-bit digital display data and correction data; and a liquid crystal display panel for effectuating liquid crystal display on the basis of N-bit digital display data from the liquid crystal driver or corrected data. The liquid crystal driver comprises one of the liquid crystal drivers of the present invention.

Using arrangements and methods such as described above contributes to the enlargement of display screen sizes and full color display of LCD panels. Also, it leads to the enhancement of performance and the reduction in the power consumption of information devices such as portable personal computers and word processors.

BRIEF DESCRIPTION OF THE DRAWINGS

FIG. 22 is a diagram showing an arrangement of a liquid crystal driver according to a seventh preferred embodiment of the invention; and FIG. 23 is a diagram showing an arrangement of a liquid crystal driver according to a eighth preferred embodiment of the invention.

DETAILED DESCRIPTION

Figure 1:
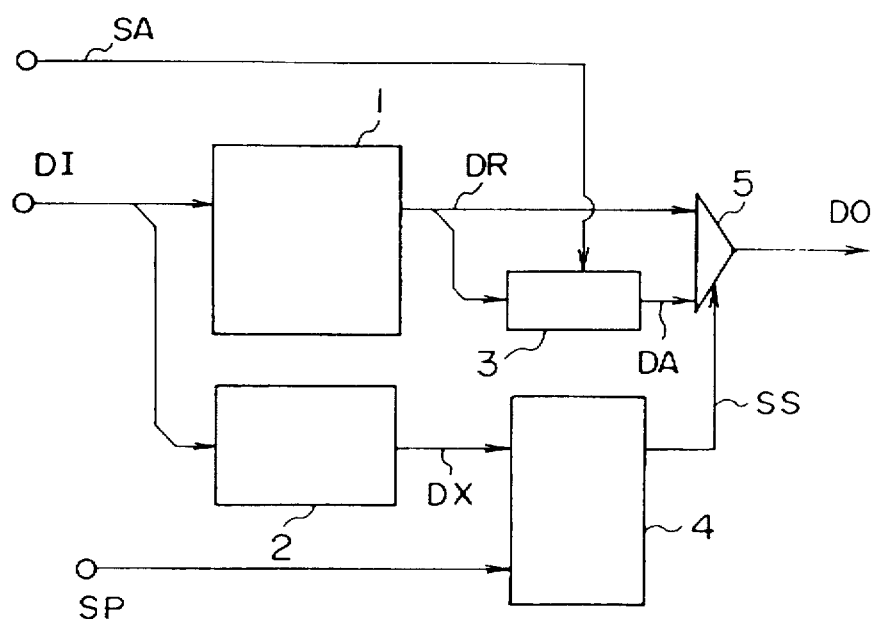
FIG. 1 is a diagram showing an arrangement of a gamma correction circuit of an liquid crystal driver according to a prior art.

Now, according to a gamma correction circuit of a liquid crystal driver according to the prior art, as shown in FIG. 1, reference data DR stored in a data table is read out by making input data DI the reading address. And, the photo-transmissive characteristic of liquid crystal is generally nonlinear, that is, the characteristic curve has moderate gradients in the vicinity of the white and black gray levels. This causes the following problems.

(i) When the number of pixels increases as display screens increase in size or as LCD panels becomes full color, the data transfer frequency must be raised. However, when the transfer frequency for image display data is set to be, e.g., 25 Mhz or more for enhancing the driving capacity of the signal processing circuit, high speed ROM's of the bipolar transistor type instead of low power consumptive ROM's of the CMOS type must be used.

This increases the electric power consumption of ROM's, which prevents information devices such as portable personal computers and word processors from reducing their electric power consumption.

(ii) In order to improve the display quality of a LCD panel (hereinafter, also referred to simply as "display means"), it is necessary to gamma-correct each of R (red signal), G (green signal) and B (blue signal) prior to the application of display data. In a gamma correction, there is used, for example, a method in which for the parts considered substantially linear and the parts with a moderate gradient of a photo-transmissive characteristic curve of liquid crystal, the contents of ROM's are read out during non-display periods and so forth to be latched for subsequent use.

However, the increase in the display gray levels causes the increase in the number of latches. For example, in case of the 256 gray scale, about 64 times the number of latches is needed as compared with the case of the 8 gray scale, where the number 64=(8+2 bits)×256 gray levels+{(3+2 bits)×8 gray levels}.

Thus, there is a problem that if this gamma correction method is applied to a unit with many gray levels, e.g., a liquid crystal driver with 64 or more gray levels, then the scale of the circuit for the data latches which are usually used in a integrated circuit form will become large, which prevents the cost reduction.

Figure 2:
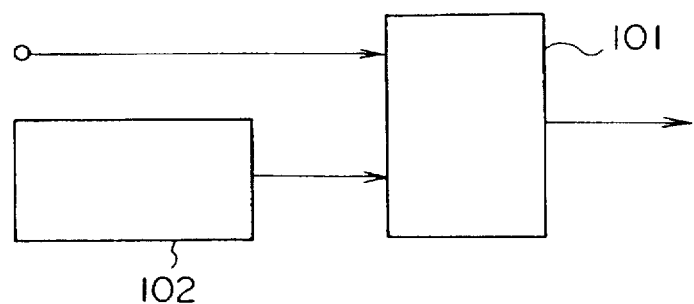
FIG. 2 is a diagram showing an arrangement of a principle gamma correction circuit according to the invention.

On the other hand, as shown in FIG. 2, a principle gamma correction circuit according to the invention comprises: data selecting means 101 for selecting and supplying either N-bit digital display data DI or correction data Cn for gamma-correcting the luminance of display means; and data output means 102 for supplying the correction data Cn, where n=1~i, ... j, ... n.

Figure 5:
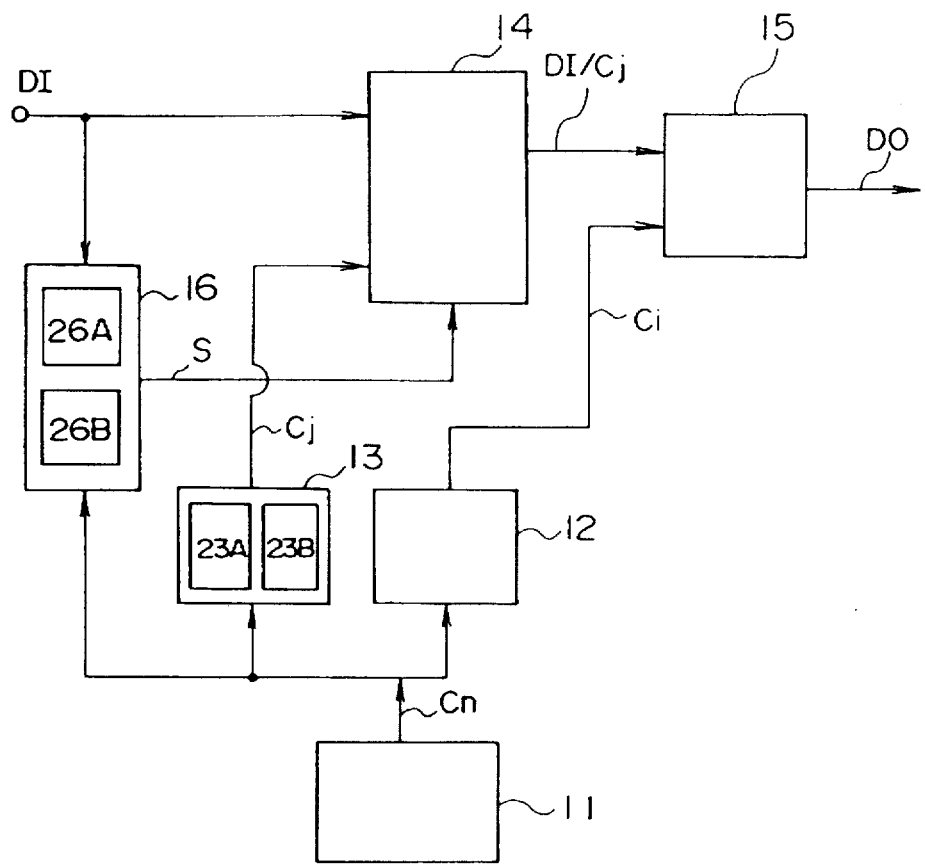
FIG. 5 is a diagram showing an internal arrangement of the principle gamma correction circuit (a first gamma correction circuit) shown in FIG. 2.

That is, as shown in FIG. 5, a first principle gamma correction circuit of the invention comprises: memory means 11 for storing correction data Cn (n=1~i, ... j, ... n) for gamma-correcting the luminance of display means; a first output means 12 for supplying a first correction data Ci for correcting the substantially linear part of the photo-transmissive characteristic curve of the display means; a second output means 13 for selecting and supplying a second correction data Cj for correcting the rest of the photo-transmissive characteristic curve of the display means; data selecting means 14 for selecting either N-bit digital display data DI or the second correction data Cj; calculation means 15 for performing an arithmetic operation on the digital display data DI or the second correction data Cj with the first correction data; and control means 16 receiving the N-bit digital display data DI and correction data Cn for generating a selection control signal S.

In the first gamma correction circuit of the invention, as shown in FIG. 5, the second output means 13 includes a latch circuit 23A for latching the correction data Cj for correcting the parts other than the substantially linear part of the photo-transmissive characteristic of the display means and a selector 23B for selecting correction data Cj.

Also, in the first gamma correction circuit of the invention, the control means 16 as shown in FIG. 5 includes a latch circuit 26A for latching the correction data Cn for gamma-correcting the luminance of the display means and a comparator 26B for comparing the correction data Cn and N-bit digital display data DI.

Figure 6:
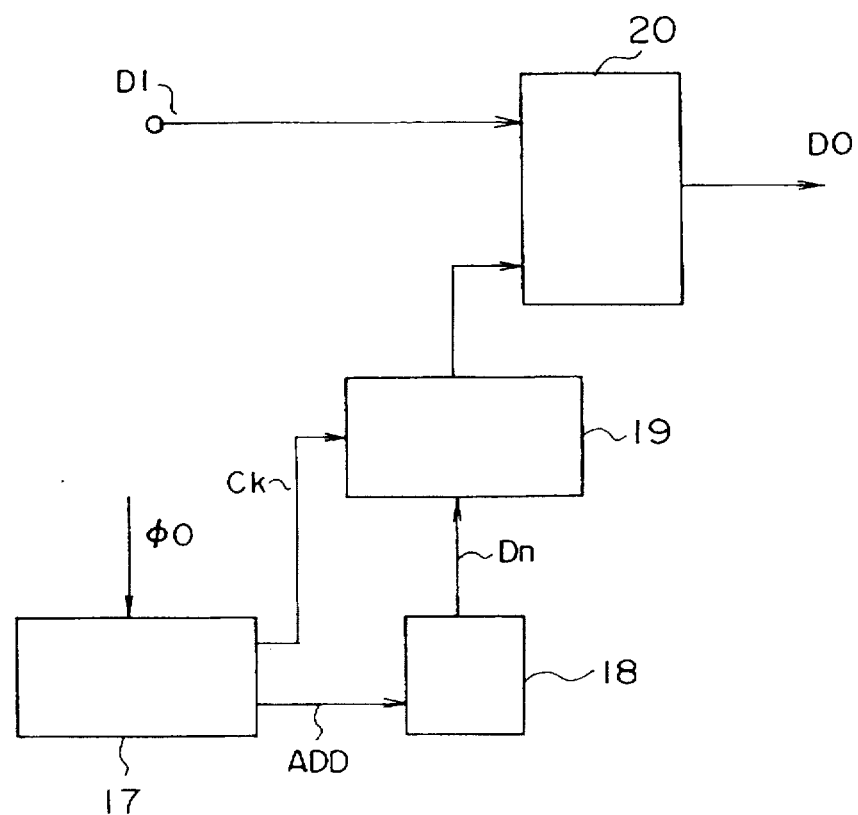
FIG. 6 is a diagram showing an internal arrangement of the principle gamma correction circuit (a second gamma correction circuit) shown in FIG. 2.

The second principle gamma correction circuit of the invention as shown in FIG. 6 comprises: control means 17 receiving a reference signal $\phi 1$ for supplying a latch control signal CK and an address ADD; memory means 18 receiving the address ADD for supplying correction data Dn (n=1~i, ... j, ... n) for gamma-correcting the luminance of display means; latch means 19 receiving a latch control signal CK for latching the correction data Dn; data selecting means 20 receiving the N-bit digital display data DI for selecting and supplying the correction data Dn.

In the second gamma correction circuit of the invention, the data selecting means 20 has an asynchronous selector.

In the second gamma correction circuit of the invention, the data selecting means 20 is formed of CMOS logic gates.

In the second gamma correction circuit of the invention, the memory means has a part of its addresses allocated for the data not yet gamma-corrected and the rest of its addresses allocated for parameters.

Figure 3:
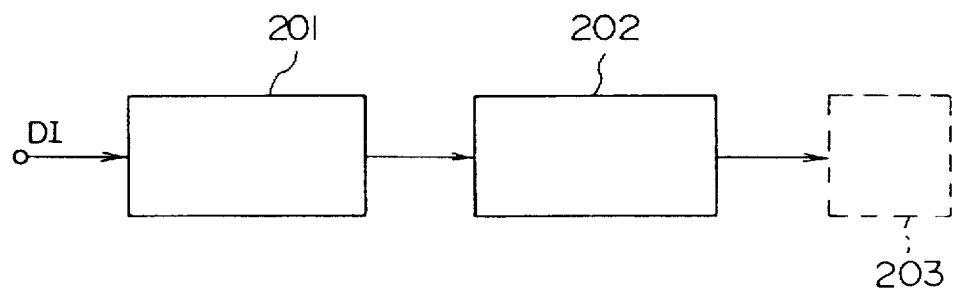
FIG. 3 is a diagram showing an arrangement of a first principle liquid crystal driver according to the invention.

The first principle liquid crystal driver of the invention as shown in FIG. 3 comprises: gamma correction circuit 201 for gamma-correcting the luminance of display means 203 receiving N-bit digital display data DI for effectuating liquid crystal display; and signal processing means 202 for performing a digital-to-analog conversion on the gamma-corrected N-bit digital display data DI. And, the gamma correction means 201 is formed of the first or second gamma correction circuit of the invention.

Figure 4:
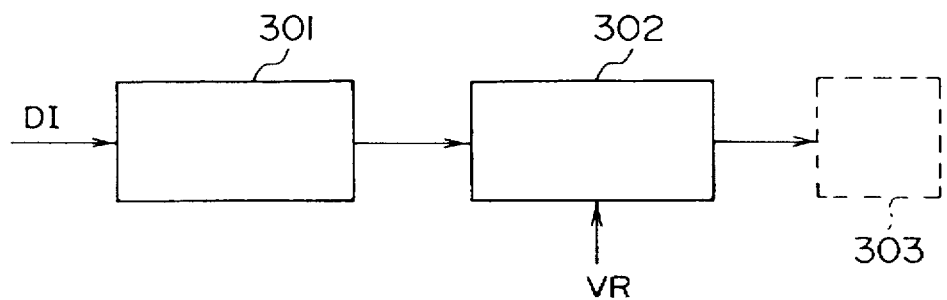
FIG. 4 is a diagram showing an arrangement of a second principle liquid crystal driver according to the invention.

The second principle liquid crystal driver of the invention, as shown in FIG. 4, comprises: gamma correction circuit 301 for gamma-correcting the luminance of display means 303 receiving N-bit digital display data DI for effectuating liquid crystal display; and signal processing means 302 receiving the gamma-corrected N-bit digital display data DI for sampling and holding a reference voltage VR, wherein the gamma correction means 301 is formed of the first or second gamma correction circuit.

The first image display method of the invention comprises the steps of: selecting either N-bit digital display data DI which is input from the outside and is not yet corrected or correction data Cn (n=1~i, ... j, ... n) for gamma-correcting the luminance of the display means; and supplying the selected digital output data as the driving data for the display means.

The second principle image display method of the invention comprises the steps of: extracting the first correction data Ci for correcting the substantially linear part of the photo-transmissive characteristic of the display means and the second correction data Cj for correcting the rest of the photo-transmissive characteristic of the display means individually from the correction data Cn (n=1~i, ... j, ... n) for gamma-correcting the luminance of the display means; selecting one out of N-bit digital display data DI and the extracted second correction data Cj; performing an arithmetic operation on either the selected digital display data DI or the selected second correction data Cj with the first correction data Ci; and supplying the calculated digital output data as the driving data for the display means.

The third principle image display method of the invention comprises the steps of: generating a latch control signal CK and an address ADD on the basis of an input reference signal $\phi 0$; reading correction data Dn (n=1~i, ... j, ... n) for gamma-correcting the luminance of the display means; latching the read correction data Dn in response to the input of a latch control signal; and selectively supplying the latched correction data Cn while receiving N-bit digital display data DI.

A principle liquid crystal display of the invention comprises a LCD panel receiving N-bit digital display data DI for effectuating liquid crystal display and a gamma corrector or a liquid crystal driver for gamma-correcting the luminance of the LCD panel. The gamma corrector or the liquid crystal driver comprises a first or a second gamma correction circuit of the invention or a first or a second liquid crystal driver of the invention.

Next, we discuss the operation of principle gamma correction circuits of the invention. When, for example, N-bit digital display data DI is input to the data selecting means 101 and correction data Cn is supplied from the data output means 102 to the data selecting means 101, the data selecting means 101 selects either the digital display data DI or the correction data Cn. More specifically, when correction data Cn for gamma-correcting the luminance of the display means is read from the memory means 11 to the first and the second output means 12 and 13, the first correction data Ci for correcting the substantially linear part of the photo-transmissive characteristic of the display means is output from the first output means 12 to the calculation means 15.

On the other hand, out of the correction data Cn, the second correction data Cj for correcting the parts other than the substantially linear part of the photo-transmissive characteristic of the display means is selected and latched by the second output means 13. At the time, as shown in FIG. 5, the second correction data Cj is latched by the data latch circuit 23A of the second output means 13 and then the latched correction data Cj is selected by the selector 23B to be output to the data selecting means 14.

The data selecting means 14 in turn selects either N-bit digital display data DI or the correction data Cj in response to the input of a selection control signal S. The selected output data DI or Cj is output to the calculation means 15. The selection control signal S is generated by the control means 16 receiving the N-bit digital display data DI and the correction data Cn. For example, as shown in FIG. 5, the correction data Cn is latched by the data latch circuit 26A of the control means 16 and is compared with the digital display data DI by the data comparator 26B. The compared result becomes the selection control signal S.

In the calculation means 15, arithmetic operation is performed on the output data DI or Cj with the correction data Ci and the corrected digital output data DO is output from the calculation means 15 to the next stage or the driving circuit.

Therefore, for the intermediate gray levels which is considered to form a substantially straight part of the photo-transmissive characteristic of the display means, gamma correction can be achieved, for example, by simple calculations by the calculation means 15. And, for the vicinity of the white or the black levels where the inclination of the photo-transmissive characteristic is relatively moderate, there can be taken a way wherein contents of the memory means 11 are read out during a non-display period and are latched to be output.

Also, according to the first gamma correction circuit, the conversion table can be divided into a plurality of blocks, each of which is allocated for the respective ranges of input gray levels. The changing of the setting enables the free changing of a semifixed range with which the calculation means 15 deals. Thus, even when gamma correction is made for each of R (a red signal), G (a green signal) and B (a blue signal), unlike the prior arts there is no need of storing the correction data for all the gray levels, enabling the increase in the number of gray levels without increasing the number of latches.

Even if the present gamma correction method is applied to a unit with many gray levels, e.g., a liquid crystal driver with 64 gray levels or more, the integrated circuit for the data latches can be downscaled and the cost can be accordingly reduced.

Now, we discuss the operation of the second gamma correction circuit. For example, as shown in FIG. 6, receiving a reference signal θ0, the control means 17 generates a latch control signal CK and an address ADD, and supply them to latch means 19 and memory means 18, respectively.

Thus, the correction data Dn for gamma-correcting the luminance of the display means is read out of the memory means 18 which has received the address. In this case, the data not yet gamma-corrected are assigned to a part of the addresses and the parameters are assigned to the rest of the addresses so that the gamma-corrected data can be read out of the memory means. The readout data from the memory means 18 is supplied to the latch means 19.

Receiving a latch control signal CK, the latch means 19 latches the correction data Dn and supplies it to the data selecting means 20, where receiving N-bit digital display data DI, the asynchronous selector formed of CMOS logic gates selects and outputs the correction data Dn.

For this reason, N-bit digital display data are gamma-corrected at a high speed. Further, the data selecting means 20 which operate asynchronously as is not the case with ROM's or RAM's can be easily constructed out of logic gates. Therefore, the reduction of the electric power consumption of the gamma correction circuit is achieved.

Accordingly, the electric power consumption of a LCD device into which the present gamma correction circuit is incorporated can be reduced.

In the operation of a first liquid crystal driver of the invention, for example, N-bit digital display data DI is gamma-corrected by a gamma correction means 201 formed of a first or second gamma correction circuit of the invention. The gamma-corrected N-bit digital display data DI is D/A converted by a signal processing means 202. In this way, the luminance of the display means 203 is gamma-corrected.

Therefore, it is possible to reduce the consumption of electric power through the application of a first or second gamma correction circuit of the invention even when the number of pixels of the display is increased and data transfer frequency is raised.

This makes it possible to increase the display screen sizes and make LCD panels full color ones. Also, it leads to the reduction in the power consumption of information devices such as portable personal computers and word processors.

In the operation of a second liquid crystal driver of the invention, for example, N-bit digital display data DI is gamma-corrected by gamma correction means 301 comprising a first or second gamma correction circuit of the invention. A reference voltage VR is sampled and held on the basis of the input of the gamma-corrected N-bit digital display data DI thereby to gamma-correct the luminance of the display means 303.

Therefore, as in case of the first liquid crystal driver, it is possible to reduce the consumption of electric power through the application of a first or second gamma correction circuit of the invention even when the number of pixels of the display is increased and data transfer frequency is raised.

This, as in case of the first liquid crystal driver, makes it possible to increase the display screen sizes and make LCD panels full color ones. Also, it leads to the reduction in the power consumption of information devices such as portable personal computers and word processors.

According to the first image display method of the invention, either N-bit digital display data DI or correction data Cn for gamma-correcting the luminance of the display means is selected. The selected digital output data is output as the driving data for the display means. This makes it possible to make gamma correction by selecting data depending on whether a correction is necessary or not.

According to the second image display method of the invention, either N-bit digital display data DI or the second correction data Cj is selected, arithmetic operation is performed on the selected digital display data DI or correction data Cj with the first correction data Ci for correcting the substantially linear part of the photo-transmissive characteristic of the display means.

Therefore, for the intermediate gray levels which is considered to form a substantially straight part of the photo-transmissive characteristic of the display means, gamma correction can be achieved, for example, by simple calculations by the calculation means. And, for the vicinity of the white or the black levels where the inclination of the photo-transmissive characteristic is relatively moderate, it is possible to correct the luminance selectively by receiving the second correction data Cj.

According to the third liquid crystal display method of the invention, a correction data Dn is read out based on an input address ADD, the correction data is latched in response to the input of a latch control signal CK. The latched correction data Dn is selectively output in response to the input of N-bit digital display data.

This enables high speed gamma correction of N-bit digital display data DI. Also, the use of logic gates instead of a matrix circuit such as ROM's, RAM's, etc. facilitates the fabrication. Thus, the electric power consumption of the gamma correction circuit is reduced.

According to a LCD device of the invention, a LCD panel is driven by a gamma corrector or a liquid crystal driver comprising a first or a second gamma correction circuit of the invention or a first or a second liquid crystal driver of the invention.

Therefore, the number of pixels of a LCD panel and the image processing speed can be increased to produce a low power high display quality LCD device, etc.

Next, we discuss illustrative preferred embodiments of the invention referring to drawings.

(1) Explanation of a First Preferred Embodiment

Figure 7:
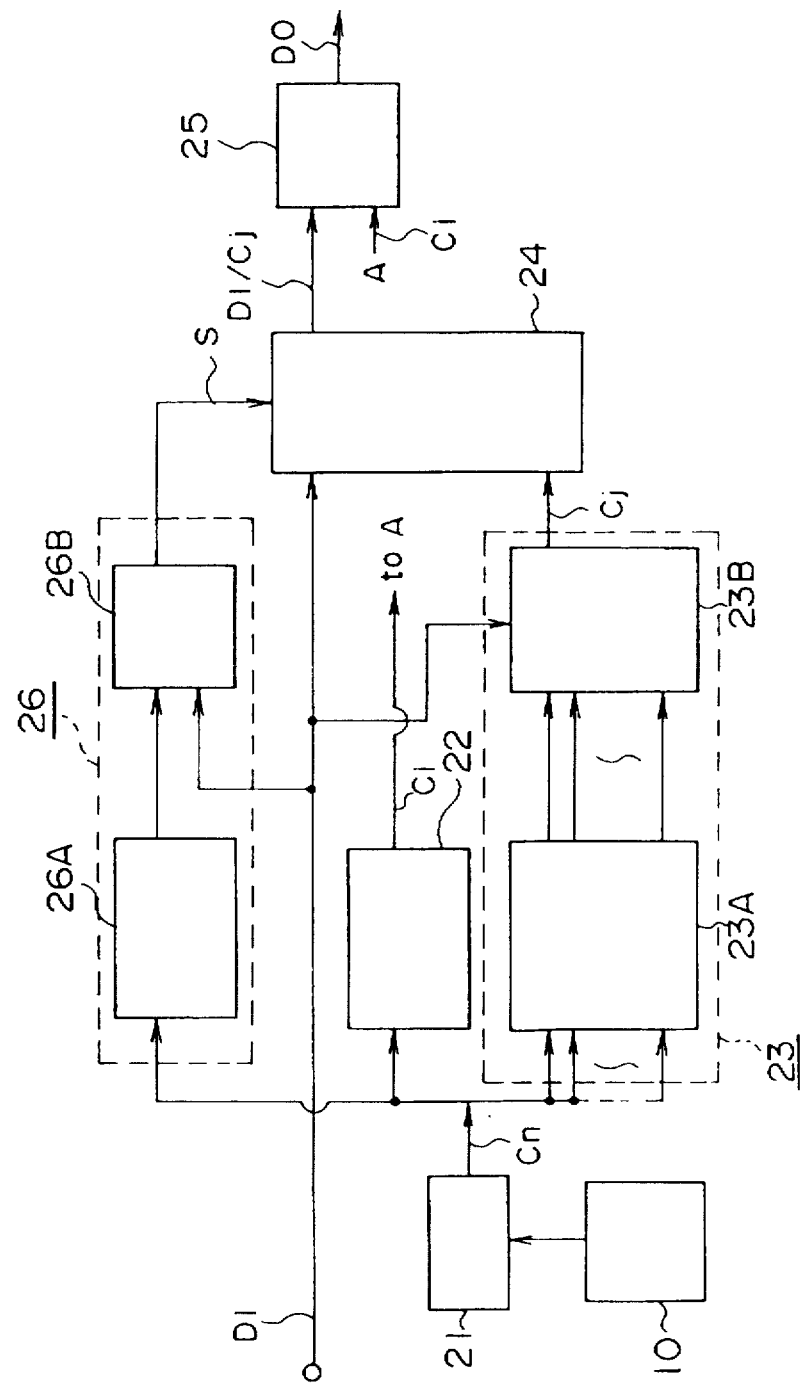
FIG. 7 is a diagram showing an overall arrangement of a gamma correction circuit according to a first preferred embodiment of the invention.

For example, a gamma correction circuit for gamma-correcting 8-bit digital display data to output 10-bit digital output data in FIG. 7 comprises a ROM (read only memory) 21, a offset latch 22, a data output section 23, a selector 24, an adder 25, a data switch 26 and a transfer controller 10.

That is, the ROM 21, the offset latch 22, the data output section 23, the data switch 26 and the transfer controller 10 forms an illustrative embodiment of the data output means 102 in FIG. 2, representative of the principles of the invention to output correction data Ci, Cj and Cn and a selection control signal S. The selector 24, which is an illustrative embodiment of the data selecting means 101, receives the selection control signal S to select and output either correction data Cn (n=1~i,... j,... n) for gamma-correcting the luminance of the display means or digital display data DI. In the following stage of the selector 24, the present embodiment is provided with an adder 25.

The ROM 21, which is an embodiment of the memory means 11, stores 8-bit correction data Cn for gamma-correcting the luminance of the LCD panel. For the ROM 21, nonvolatile read only memories or erasable read only memories are used. The details of the photo-transmissive characteristic of a LCD panel will be given in connection with FIG. 9.

The offset latch 22, which is an illustrative embodiment of the first output means 12, outputs the correction data (hereinafter referred to as "fixed data") Ci for correcting the substantially linear part of the photo-transmissive characteristic of the LCD panel. For example, the latch 22 includes a latch circuit 22A and a selector 22B as shown in the circuit for gamma-correcting the red (R) signal in FIG. 8. The latch circuit 22A latches the fixed data Ci and offsets, that is, latches the fixed data Ci of four 10-bit palettes #1 through #4. The selector 22B receives a selection control signal S and on the basis thereof outputs the fixed data Ci to the adder 24.

The data output section 23, which is an illustrative embodiment of the second output means 13, selects and outputs the correction data Cj for correcting the part other than the substantially linear part of the photo-transmissive characteristic of the LCD panel. The data output section 23 includes a data latch circuit 23A for latching correction data Cj and a selector 23B.

Figure 8:
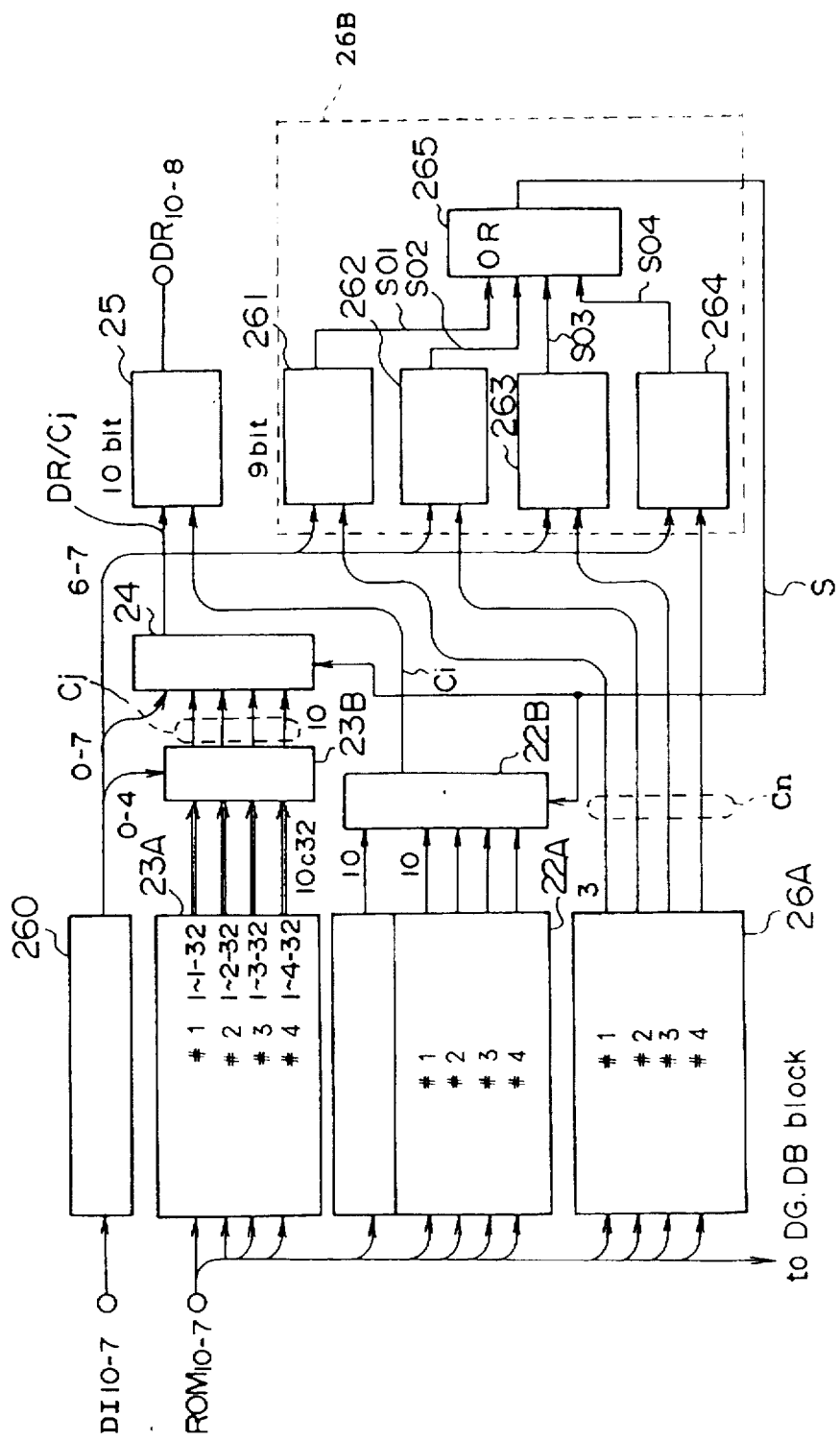
FIG. 8 is a diagram showing an arrangement of a circuit relating to a red signal of the gamma correction circuit shown in FIG. 7.

For example, the data latch circuit 23A as shown in FIG. 8, latches four 10×32 bit palettes #1-1~1-32 through #4-1~4-23 of correction data. The selector 23B receives digital display data DI of 0 to 4 bits and outputs correction data Cj to the selector 24. The selector 24, which is an illustrative embodiment of the data selection means 14, receives the digital display data DI or the selection control signal S to select among correction data Cj.

The adder 25, which is an illustrative embodiment of the calculation means 15, adds the fixed data Ci to the selected digital display data DI or correction data Ci to output digital output data. For example, a 10-bit adder 25 is used for the operational means 15.

The data switch 26, which is an illustrative embodiment of the control means 16, receives digital display data DI and correction data Cn and on the basis thereof generates a selection control signal S. The data switch 26 has a data latch circuit 26A and a data comparator 26B to identify whether it is in a "correction" state or a "calculation" state. The data latch circuit 26A latches correction data Cn. In FIG. 8, the data latch circuit 26A includes latch circuits which latches the addresses for the four palettes #1 through #4. Also, The data comparator 26B of the data switch 26 as shown in FIG. 8 includes a data latch 260, four 3-bit comparator 261 through 264 and a 4-input logical sum circuit (hereinafter, only referred to as "OR circuit") 265.

The data latch 260 latches digital display data DI. The comparator 261 compares the address of palette #1 and 5 to 7-bit digital display data DI to output the resultant signal S01 to the OR circuit 265. Similarly, the comparator 262 compares the address of palette #2 and 5 to 7-bit digital display data DI to output the resultant signal S02 to the OR circuit 265. The comparator 263 compares the address of palette #3 and 5 to 7 bit digital display data DI to output the resultant signal S03 to the OR circuit 265. The comparator 264 compares the address of palette #4 and 5 to 7 bit digital display data DI to output the resultant signal S04 to the OR circuit 265.

The OR circuit 265 inputs the logical values of the signal S01 through S04 and on the basis thereof generates the selection control signal S to supply it to each of the selectors 22B and 24. The transfer controller 10 controls a read operation of ROM 21.

Figure 9:
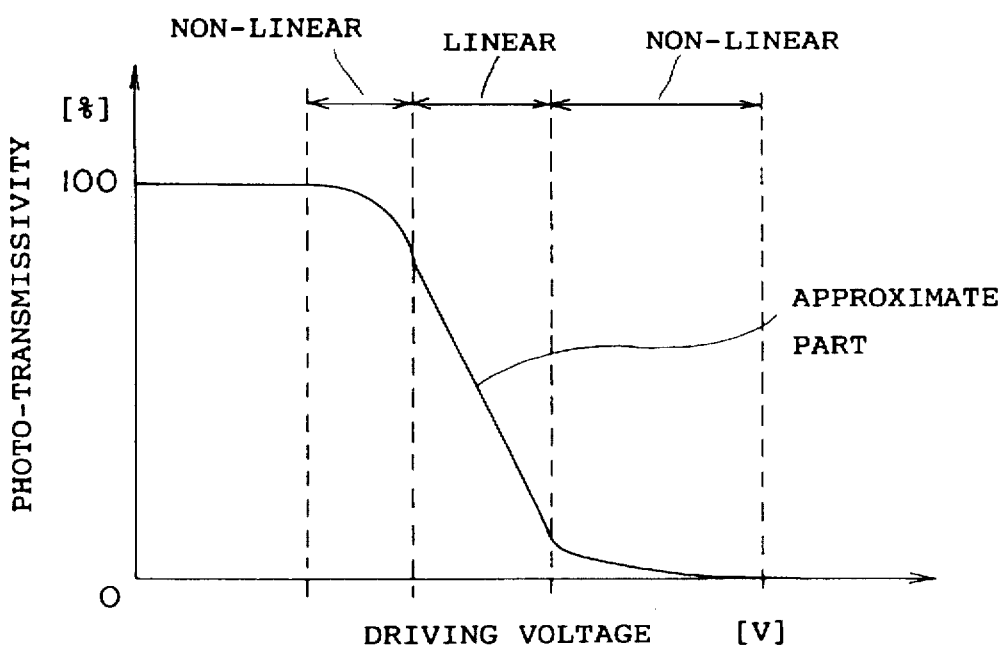
FIG. 9 is a diagram illustrating the photo-transmissive characteristic of liquid crystal according to a first preferred embodiment of the invention.

Now, we discuss the light response (driving voltage versus photo-transmissivity) characteristic of a LCD panel. For example, the photo-transmissive characteristic of twisted nematic liquid crystal is shown in FIG. 9, where the axis of abscissas indicates the driving voltage [V] and the axis of ordinates indicates the photo-transmissivity [%]. In FIG. 9, the characteristic forms moderate curved parts in the vicinities of the white level (the photo-transmissivity≈100%) and the black level (the photo-transmissivity≈0%) and forms a substantially linear part in the intermediate gray levels. Thus, since the relation between the driving voltage and the photo-transmissivity in the middle is considered to be linear, we adopt a method of gamma correction by approximation of linear type in the illustrative embodiments of the invention.

Table 1 shows the conditions under which N-bit digital display data DI is converted into M-bit digital output data DO.

TABLE 1

| Conversion type | Use a correction data | | Add the fixed data | Use a correction data | |
|---|---|---|---|---|---|
| Input data (3 bits) | 0 | 1 | 2 through 5 | 6 | 7 |
| Output data (4 bits) | 0 | 4 | input data +4 | 11 | 15 |

We assume that, for example, for the two lowest data "0" and "1" and the two highest data "6" and "7" out of eight 3-bit digital display data DI (=0, . . . , 7), a correction data Cj is used for the data conversion, and for the intermediate data 2 through 5 the fixed data is added to the data DI. In this case, the offset is 4, which means that 4 is added to the digital display data DI or the correction data Cj.

Figure 10:
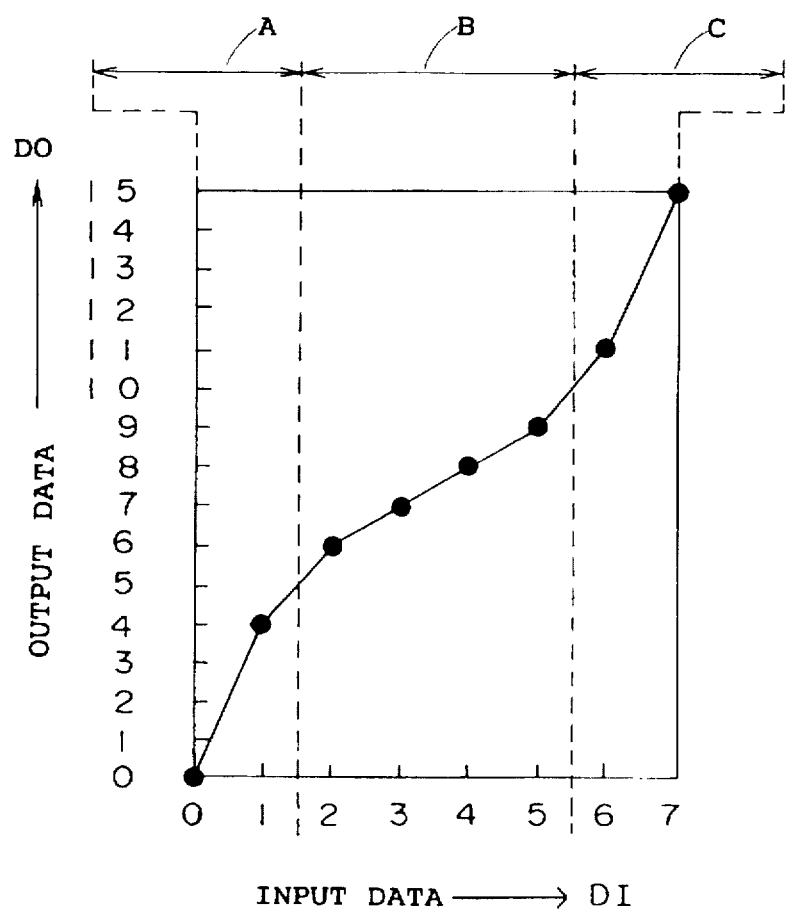
FIG. 10 is a diagram showing the gamma correction characteristic in case of a data conversion of the gamma correction circuit shown in FIG. 7.

FIG. 10 is a diagram showing the gamma correction characteristic in case when a data conversion is done under the conditions of Table 1. The axis of abscissas indicates the not-yet-converted digital display data DI and the axis of ordinates indicates the converted digital display data DO. From Table 1, it is seen that the gamma correction characteristic curve is nonlinear as the photo-transmissive characteristic of liquid crystal is. In FIG. 10, the domains A and C are the areas where the conversion table (of the correction data Cj) is applied, and the domain B is the area where the fixed data Ci is added (the linear approximation area).

Figure 11:
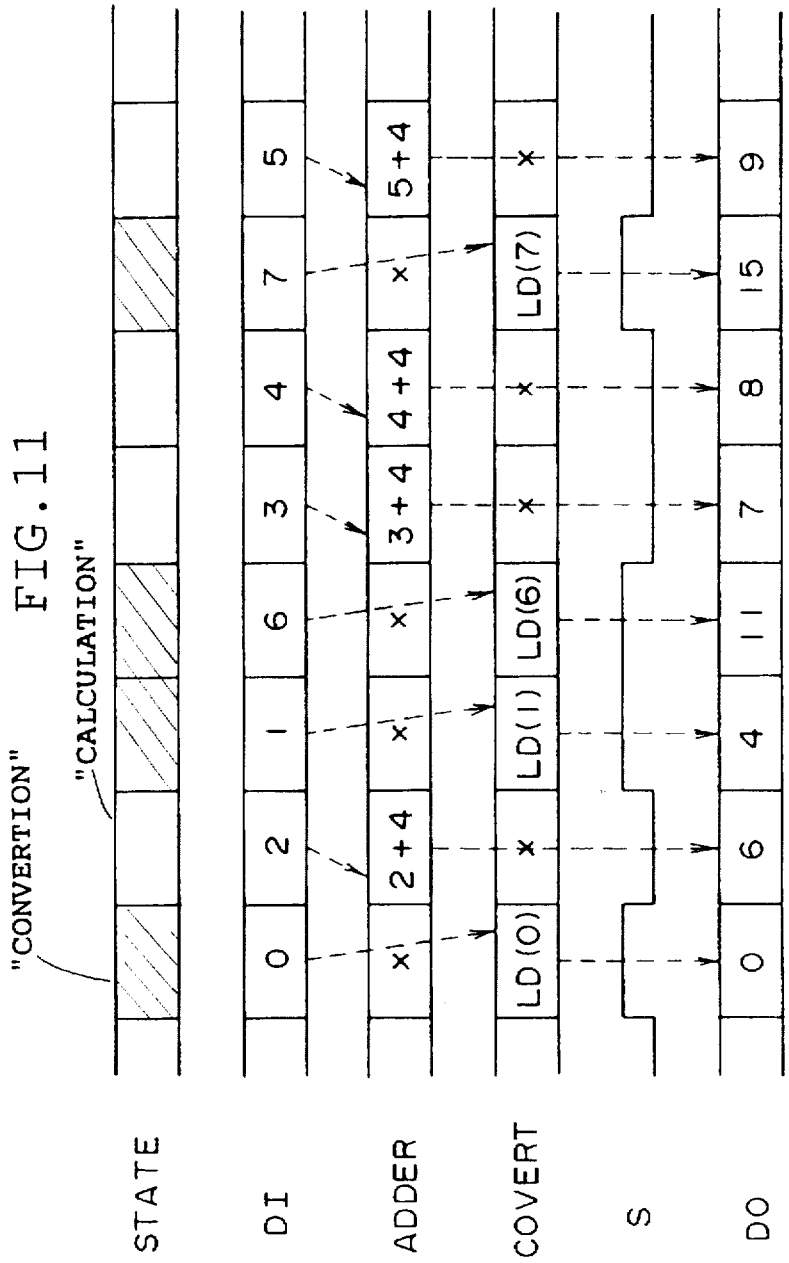
FIG. 11 is a diagram illustrating the operation of the gamma correction circuit shown in FIG. 7.
Figure 12:
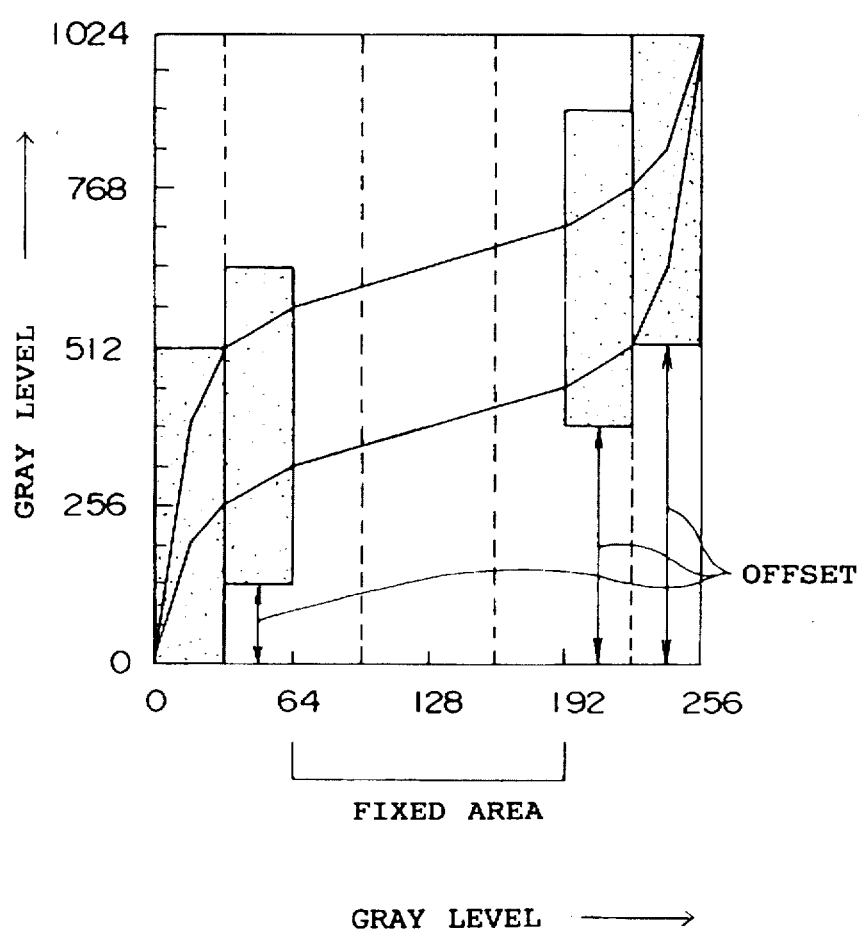
FIG. 12 is a diagram showing the characteristic of gamma correction (in case of fixed 64 through 192 gray scale) according to the gamma correction circuit shown in FIG. 7.
Figure 13:
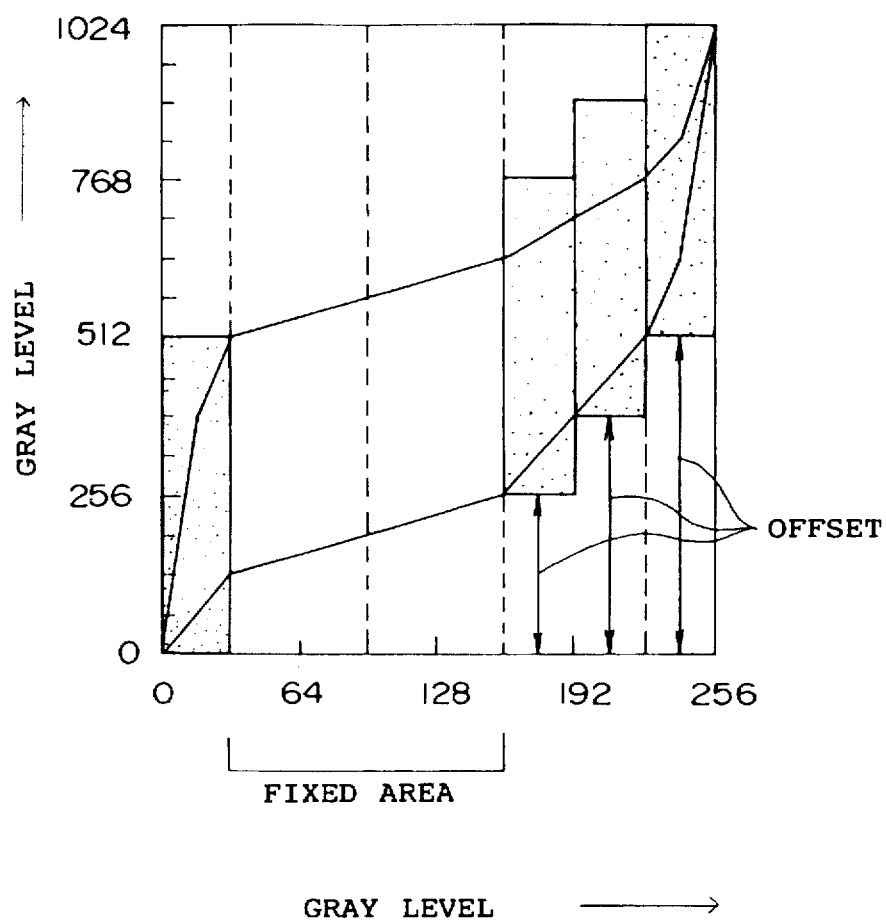
FIG. 13 is a diagram showing the characteristic of gamma correction (in case of fixed 32 through 160 gray scale) according to the gamma correction circuit shown in FIG. 7.

Next, we discuss the operation of a gamma correction circuit of the invention referring to FIGS. 11 through 13.

For simplicity, we deal with the case of a conversion from 3-bit digital display data DI to 4-bit digital output data DO. For example, in case of the data conversion under the conditions of Table 1, as shown in FIG. 11, when the gamma correction circuit is in a "conversion" state, the correction data Cn read from the ROM 21 is supplied to the offset latch 22 and the data latch circuit 23A. In the data output section 23, the correction data Cj for correcting the parts other than the substantially linear part of the photo-transmissive characteristic of the LCD panel is selected and latched. In this case, each of the four comparator 261 through 264 compares the three most significant bits of the digital display data DI with the addresses specifying the range of the input gray scale which the corresponding four block deals with as shown in FIG. 12. If any match are found, four 10×32 bit palettes #1-1~1-32 through #4-1~4-23 of correction data Cj as shown in FIG. 8 is latched in response to the data DI by the data latch circuit 23A.

The selector 23B selects the correction data corresponding to the specified gray scale range out of the latched correction data Cj to output it to the selector 24. In FIG. 11, the notation LD(i) denotes the correction data Cj for the relevant digital display data DI.

Further, the selector 24 receives a selection control signal S and selects a relevant correction data Cj to output it to the adder 25. It is noted that the selection control signal S is generated by the data switch 26 on the basis of the input 3-bit digital display data DI and correction data Cn. More specifically, the data latch circuit 26A latches correction data Cn, which is compared with digital display data DI in the data comparator 26B. The result of the comparison provides the selection control signal S.

Thus, since the present gamma correction circuit is in a "conversion" state, the adder 25 effectuates the addition of "0" and outputs the calculation result as digital output data DO to the driving circuit in the next stage. In some cases, the fixed data Ci instead of "0" may be added.

Also, in FIG. 11, when the gamma correction circuit is in a "calculation" state, correction data Cn read from the ROM 21 are supplied to the offset latch 22 and the data latch circuit 23A, the former of which does not select correction data Cj, and the latter of which latches the fixed data Ci for correcting the substantially linear part of the photo-transmissive characteristic of an LCD panel, which is output to the adder 25.

The adder 25 adds the fixed data Ci to the digital display data DI to output the corrected 4-bit digital output data DO to the next stage or the driving circuit. In the same way, the subsequent data DI is successively gamma-corrected by the data output section 23 receiving data conversion conditions, the data switch 26 identifying the state of the circuit and the adder 25 adding "0" or the fixed data Ci (the offset=4) to the data DI according to the state of "conversion" or "calculation", respectively.

As described above, a gamma correction circuit according to a first preferred embodiment of the invention as shown in FIGS. 7 and 8 comprises a ROM 21, an offset latch 22, a data output section 23, a selector 24, an adder 25, a data switch 26 and a transfer controller 10.

With this arrangement, gamma correction is made for the intermediate levels of gray scale for which the photo-transmissive characteristic of the LCD panel is considered to be linear by a simple calculation by the adder 25, and for the vicinity of the white and the black levels of gray scale for which the photo-transmissive characteristic has moderate inclinations, data is converted by reading the contents of the ROM 21 in a non-display period and latching them in the latch circuit 23A.

Also, in the present embodiment as shown in FIG. 12, the 256 gray levels of digital display data DI is divided into eight blocks of 32-gray levels and a correction table is allocated for each of four blocks of them.

This permits the four blocks to be independently provided with a set of a conversion table (10 bits for each) for 32 gray levels, a fixed data Ci added after the data conversion and the addresses ADD specifying the range of the input gray levels which the respective blocks deal with.

Thus, when 8-bit digital display data DI is converted into 10-bit digital output data DO, as shown in FIG. 12, gamma correction is made by supplying the fixed data Ci to the adder 25 for the 64th through 192nd levels of the 256 gray levels which are in the range associated with the fixed data Ci. And, for the 0th through 63th gray levels and the 193nd through 256th gray levels, gamma correction is made by using gamma correction by the adder 25 and correction data Cj from the data output section 23 at the same time.

Further, as shown in FIG. 13, for the 256 gray levels, assuming the 32nd through 160th gray levels to be in the range associated with the fixed data Ci, gamma correction is made by supplying the fixed data Ci to the adder 25. For the 0th through 31 gray levels and the 161th through 245th gray levels, gamma correction is made by using gamma correction by the adder 25 and correction data Cj from the data output section 23 at the same time. In FIGS. 12 and 13, the axis of abscissas indicates the not-yet-converted input data and the axis of ordinates indicates the gamma-converted output data.

Furthermore, in the present embodiment, the fixed data Ci is latched for each conversion table block to be added to its correction data Cj after the data conversion. This provides digital output data DO and reduces the number of latches. Note that the dotted portion in FIGS. 12 and 13 correspond to latches which latches its correction data Cj.

Thus, this gamma correction circuit being applied to a liquid crystal driver of high gray scale, the adder 25 plays a main role in the correction of intermediate gray levels which form a substantially linear part of the photo-transmissive characteristic of the LCD panel so that the number of latch circuits can be greatly reduced. Therefore, the integrated circuit portion for latches can be downscaled causing the cost to be reduced.

It should be noted that though in the first preferred embodiment a gamma correction circuit relating to a red signal is explained, the data conversion for green and blue can be performed in the same way. Since there is no need for storing the correction data Cn for all the gray levels as in the prior arts, the capacity of the ROM 21 can be reduced.

(2) Explanation of a Second Preferred Embodiment

Figure 14:
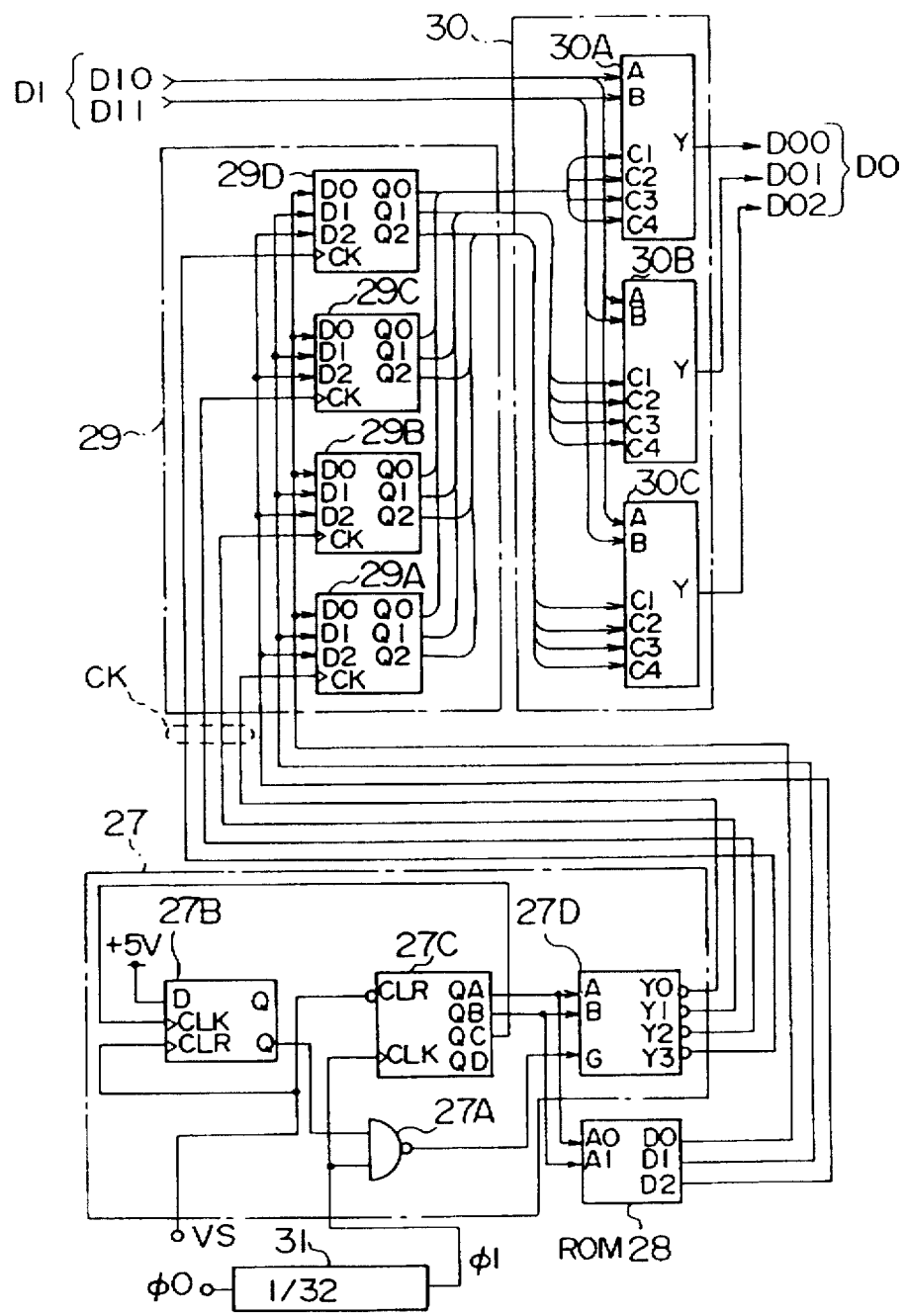
FIG. 14 is a diagram showing an arrangement of a gamma correction circuit according to a second preferred embodiment of the invention.

For example, a gamma correction circuit for gamma-correcting and converting 2-bit input data DI=[DI0, DI1] into 3-bit output data DO=[DO0, DO1, DO2] as shown in FIG. 14 comprises a read/latch controller 27, a ROM 28, a latch circuit 29 and selector 30.

Specifically, the read/latch controller 27, which is an illustrative embodiment of the control means 17, supplies a latch control signal CK and addresses ADD in synchronism with a clock $\phi 1$. The controller 27 includes a NAND gate 27A, a D flip-flop 27B, a counter 27C and a decoder 27D.

The NAND circuit 27A receives a inverted output $\overline{Q}$ of the D type flip-flop 27B and the clock $\phi 1$ to output the logic output signal G to the decoder 27D. The D type flip-flop 27B is reset by the vertical synchronous signal VS and a count output QC of the counter 27C to outputs its inverted output signal $\overline{Q}$ to the NAND gate 27A. The vertical synchronous signal VS is supplied to the clear input terminal CLR of the counter 27C and the clear input terminal CLR of the D type flip-flop 27B in common.

The counter 27C receives the vertical synchronous signal VS and the clock $\phi 1$ to supply count outputs QA through QC. The output terminals QA and QB is connected to the input terminals "A" and "B" of the counter 27C and to the input terminals "A0" and "A1" of the ROM 28, respectively. The third least significant output terminal QC is connected to the clock input terminal CLK of the D type flip-flop 27B.

The count outputs QA and QB form an address ADD which is supplied to the decoder 27D and the ROM 28. The decoder 27D receives the logic output signal G and the count outputs QA and QB to generate latch control signals CK which is formed of 4 bits, that is, Y0 through Y3.

The ROM 28, which is an illustrative embodiment of the memory means 18, is a memory receiving the address ADD for supplying a correction data Dn (n=0, 1, 2) for gamma-correcting the luminance of the LCD panel. In the present embodiment, the ROM 28 has a part of its addresses allocated for the data not gamma-corrected and has the rest of its addresses allocated for the parameters to make them the data for the use after gamma correction.

Figure 16:
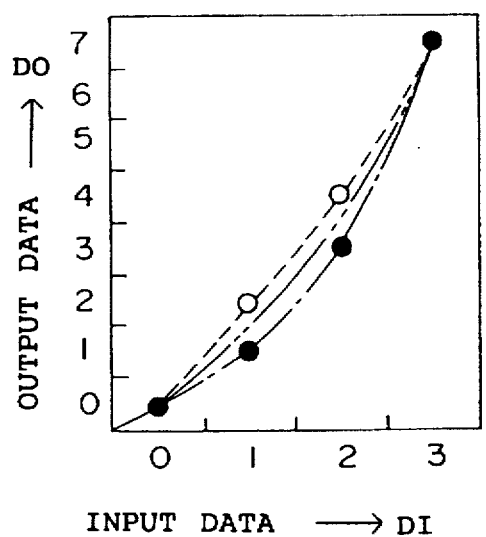
FIG. 16 is a diagram showing the gamma correction characteristic (hereinafter, referred to as "the DI/DO characteristic") in case of a data conversion of the gamma correction circuit shown in FIG. 14.

The correction data Dn are stored in the ROM 28 as a data conversion table for gamma correction. For example, when the addresses 0, 1, 2 and 3 are input to the address terminals A0 and A1 of the ROM 28, it outputs the correction data Dn=0, 1, 3, 7 as shown with the marks ● in FIG. 16 from its output terminals D0 through D2, which are connected to the data input terminals D0 through D2 of each of the latch circuits 29A through 29D. In FIG. 16, the axis of abscissas indicates the input data DI not yet gamma-corrected and the axis of ordinates indicates the gamma-converted output data DO.

The latch circuit 29, which is an illustrative embodiment of the latch means 19, latches the correction data on the basis of the latch control signal CK. The latch circuit 29 includes four latches 29A through 29D. The latches 29A through 29D hold respective correction data D0 through D2 in response to the input of the latch control signals CK. Specifically, the latch 29A outputs a selected correction data C1 to each of the selectors 30A through 30C in response to the input of the latch signal Y0. Similarly, the latch 29B outputs a selected correction data C2 to each of the selectors 30A through 30C in response to the latch signal Y1. The latch 29C outputs a selected correction data C3 to each of the selectors 30A through 30C in response to the input of the latch signal Y2. The latch 29D outputs a selected correction data C4 to each of the selectors 30A through 30C in response to the input of the latch signal Y3.

The selector circuit 30, which is an illustrative embodiment of the data selecting means 20, includes 3 asynchronous selectors 30A through 30C to select one out of the 3-bit correction data candidates C1 through C4 on the basis of 2-bit digital display data DI for the output.

Each of the data input terminals C1 through C4 of the selector 30A is connected to each data output terminal Q0 of the respective latches 29A through 29D. Similarly, each of the data input terminals C1 through C4 of the selector 30B is connected to each data output terminal Q1 of the respective latches 29A through 29D. Each of the data input terminals C1 through C4 of the selector 30C is connected to each data output terminal Q2 of the respective latches 29A through 29D.

Figure 15:
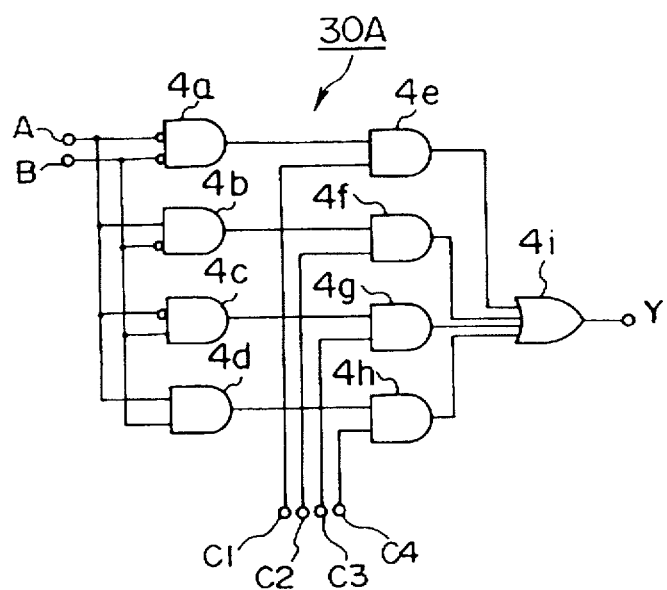
FIG. 15 is a diagram showing an internal arrangement of the selector of the gamma correction circuit shown in FIG. 14.

The selectors 30A through 30C each comprises CMOS gates. For example, as shown in FIG. 15, the selector 30A includes AND gates 4a through 4h and OR gates 4i. The OR gates 4i outputs an output data Y=D0.

The 1/32 frequency divider 31 divides the reference signal $\phi 0$ into the clock $\phi 1$ to output it to the NAND gate 27A and the counter 27C. The clock $\phi 1$ has, for example, a frequency into which the reference signal $\phi 0$ of 25 Mhz is divided by a factor of 32, that is, about 780 Khz with a period of 1.3 μs.

Figure 17:
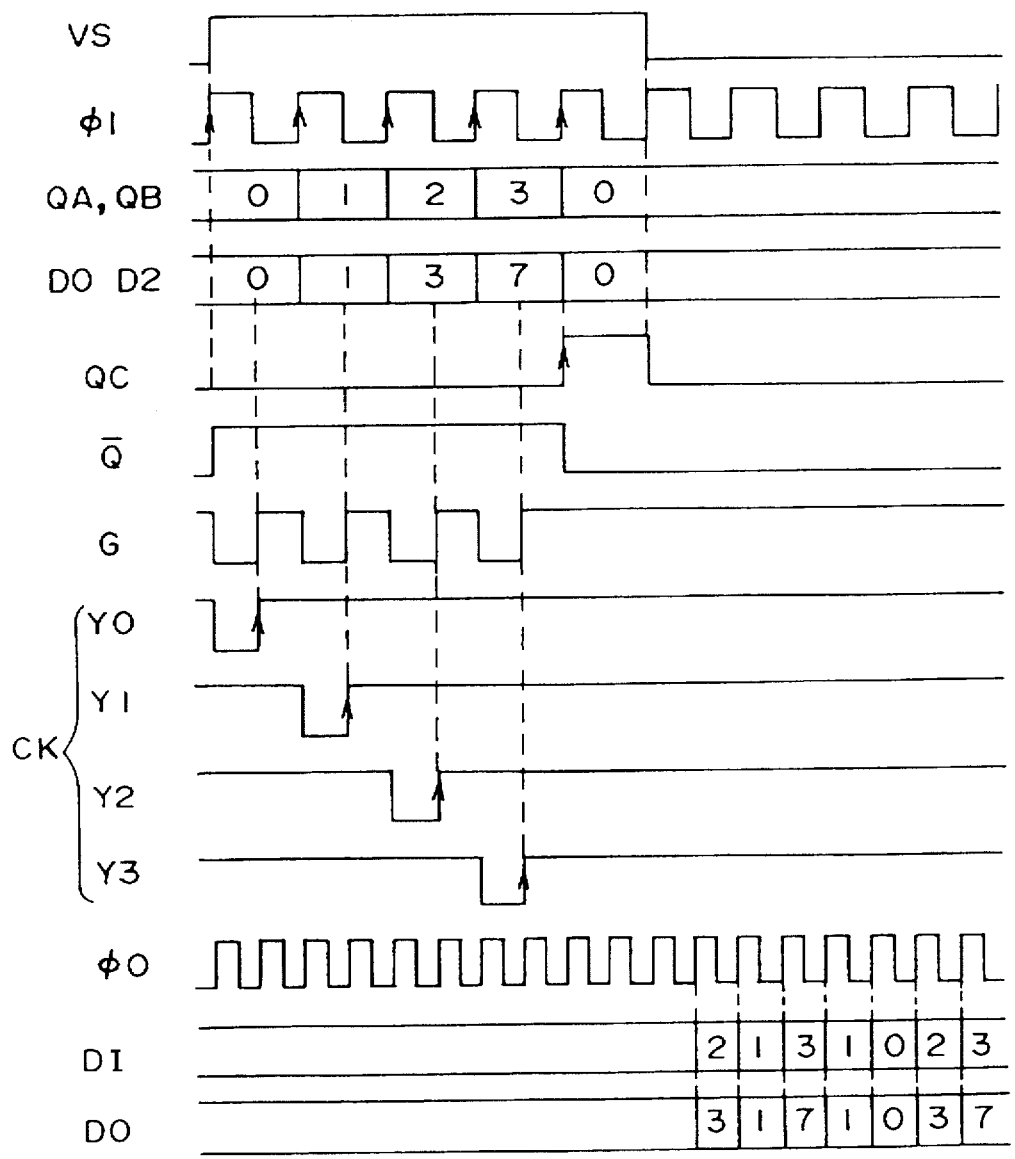
FIG. 17 is a diagram illustrating the operation of the gamma correction circuit shown in FIG. 14.

Now, we discuss the operation of a gamma correction circuit according to the second illustrative embodiment of the invention. For example, as shown in FIG. 17, when the vertical synchronous signal VS and the clock $\phi 1$ rises, the latch control signal CK and the addresses ADD are generated on the basis of the clock $\phi 1$ in the control circuit 27. At this time, the output terminals QA, QB and QC of the counter 27C becomes "0" all together, and the inverted output $\overline{Q}$ of the D type flip-flop 27B becomes "1", which enables the NAND gate 27A to output the logic output signal G to the decoder 27D.

Further, since the $\phi 1$ is input to the other input of the NAND gate 27B, the NAND gate 27B outputs the inverted version of the clock $\phi 1$, which is supplied to an output gate controlling input terminal G of the decoder 27D. The clock $\phi 1$ is also supplied to the clock input terminal CLK of the counter 27C. Then, the decoder 27D decodes the address supplied to its data input terminals A and B and outputs a negative pulse from one of its data output terminals Y0 through Y3 at the timing of the output gate controlling input terminal G being "0". The signal Y0 through Y3 serves as latch control signal CK.

When the signal CK is output to the latch circuit 29 and the addresses are output to the ROM 28, on the basis of the addresses ADD, the correction data D0 through D2 for gamma-correcting the luminance of the LCD panel are read from the ROM 28. In this case, since the data not yet gamma-corrected data is assigned to the lower address line and the parameters are assigned to the higher address line, the gamma-corrected data are read out from the data lines of the ROM 28. These data D0 through D2 are supplied from the ROM 28 to the latch circuit 29.

The latch circuit 29 latches the correction data D0 through D2 in response to the input of the latch control signal CK. That is, the correction data D0 through D2 are latched at the rising edge of the latch control signal CK by the latches 29A through 29D.

Thus, 3-bit candidates C1 through C4 for the correction data are supplied to the selector circuit 30. The selector circuits 30 selects one out of the 3-bit candidates C1 through C4 on the basis of the 2-bit digital display data DI to output the digital output data DO=[DO0, DO1, DO2].

For example, as shown in FIG. 17, the series of data, 2, 1, 3, 1, 0, 2, 3 which are input in synchronism with the clock φ1 will result in such changes of the output data as 3, 1, 7, 1, 0, 3, 7. Note that though the period of the reference signal θ0 is 1/32 of that of the clock φ1, the former is shown enlarged in order to be easily seen.

Further, when the count of the counter 27C becomes 4, the D type flip-flop 27B latches the value 1 supplied to its data input terminal D setting its inverted output $\bar{Q}$ to be 0, which causes the NAND gate 27B to close. By this, the output gate controlling input terminal G of the decoder 27D is kept 1 causing the data output terminals Y0 through Y3 of the decoder 27D to hold 1's. Subsequently, the vertical synchronous signal VS rises synchronously with the rising of the clock φ1, which causes the output terminal QC of the counter 27C to become 0.

Thus, a gamma correction circuit according to the second preferred embodiment of the invention comprises a control circuit 27, a ROM 28, a latch circuit 29 and a selector circuit 30 as shown in FIG. 14.

With such an arrangement, when the address input (A0, A1) to the ROM 28 varies as 0, 1, 2 and 3 in sequence, a series of correction data Dn=0, 1, 3 and 7 are sequentially read out from the output terminals D0 through D2 of the ROM 28. Each of the correction data Dn is held in the respective latches 29A through 29D the contents of which are supplied to the selector circuit 30.

Thus, by supplying the input data [DI0, DI1] to the selection control input terminals A and B of each of the selectors 30A, 30B and 30C, the digital output data DO can be derived from the data output terminals Y of each selector 30A, 30B, 30C.

In this case, if the data supplied to the selection control input terminals A and B are 0, 1, 2, 3, then each of the selectors 30A through 30C selects the data input terminal C1, C2, C3, C4, respectively.

For example, when the input data DI is 2, each data input terminal C3 of the selectors 30A through 30C is selected causing the data from the data output terminals Q0, Q1 and Q2 of the latch 29C to be output via the selectors 30A through 30C as the output data [DO0, DO1, DO2].

From the foregoing, the selector circuit 30 can be easily composed by using logic gates instead of a matrix circuit such as ROM's, RAM's, etc. The arrangement makes it possible to gamma-correct N-bit digital display data DI at a high speed. Also, further reduction of the electric power consumption is possible by composing the gamma correction circuit with CMOS.

Furthermore, even when the transfer frequency of digital display data DI is made, e.g., 25 Mhz or more, low power CMOS ROM's can be used without the need of going so far as to use ROM's of bipolar transistors, which contributes to the reduction of the electric power consumption of the gamma correction circuit.

Accordingly, the consumption of the electric power of information devices such as portable personal computers, word processors, etc. can be possible.

(3) Explanation of a Third Preferred Embodiment

Figure 18:
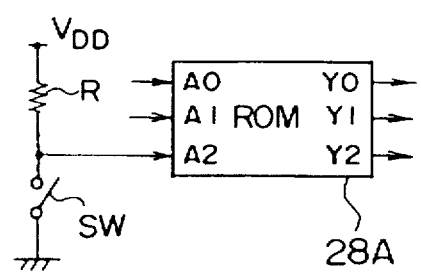
FIG. 18 is a diagram showing an arrangement of a control circuit for ROM in a gamma correction circuit according to a third preferred embodiment of the invention.

In a third illustrative embodiment, unlike the first and the second illustrative embodiments, a ROM 28A is provided with a control switch SW as shown in FIG. 18.

That is, the ROM 28A in the third embodiment has 3-bit address inputs, the highest bit A2 being intended for parameter input.

The highest bit A2 is connected to the power supply line VDD via a pull-up resistor R and to the ground line via the control switch SW.

When the control switch SW is "off", the ROM 28A outputs the data shown with the marks ● in FIG. 16 for the input of a part of the address, A0 and A1. When the control switch SW is "on", the ROM 28A outputs the data shown with the marks ◯ in FIG. 16 for the input of a part of the address, A0 and A1. The other points are the same as in the second illustrative embodiment, so their explanation is omitted.

Thus, according to the third preferred embodiment of the invention, gamma correction can be adjusted in response to the operation of the control switch SW.

(4) Explanation of a Forth Preferred Embodiment

Figure 19:
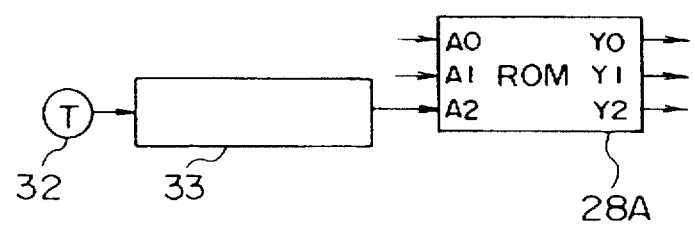
FIG. 19 is a diagram showing an arrangement of a control circuit for ROM in a gamma correction circuit according to a fourth preferred embodiment of the invention.

Unlike the first through the third embodiments, the ROM 28A in a forth illustrative embodiment is provided with a thermal detector 32 and a comparator 33 as shown in FIG. 19.

Specifically, the difference from the third embodiment lies in that in this illustrative embodiment the ambient temperature of the LCD panel detected by the thermal detector 32 is expressed with a binary digit, which is supplied to the most significant bit A2 of the address for the ROM 28A. This embodiment is identical with the third embodiment in the other point. Note that the comparator 33 may be replaced by an A/D converter.

Thus, in accordance with the forth preferred embodiment of the invention, gamma correction is automatically adjusted in response to the ambient temperature.

(5) Explanation of a Fifth Preferred Embodiment

Figure 20:
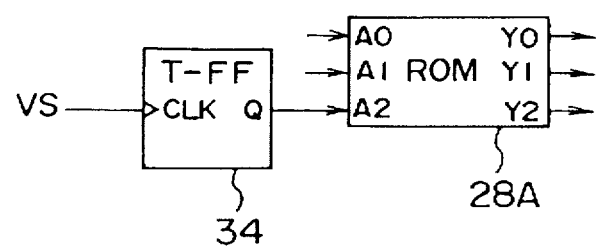
FIG. 20 is a diagram showing an arrangement of a control circuit for ROM in a gamma correction circuit according to a fifth preferred embodiment of the invention.

Unlike the first through the fourth embodiments, the ROM 28A in a fifth illustrative embodiment is provided with a T type flip-flop 34 as shown in FIG. 20.

Specifically, the difference from the third embodiment lies in that in this illustrative embodiment the vertical synchronous signal VS is supplied to the T type flip-flop 34 to cause it to output from its output terminal Q a signal which inverts itself every field of picture, the signal being supplied to the most significant bit A2 of the address for the ROM 28A. This embodiment is identical with the third embodiment in the other point. Note that the T type flip-flop 34 may be replaced by a counter.

Thus, in accordance with the fifth preferred embodiment of the invention, the DI/DO characteristic of ● marks and the DI/DO characteristic of ◯ marks as shown in FIG. 16 are alternated every time a field is displayed, which yields an intermediate DI/DO characteristic as shown with a double-dotted chain line in the figure.

(6) Explanation of a Sixth Preferred Embodiment

Figure 21:
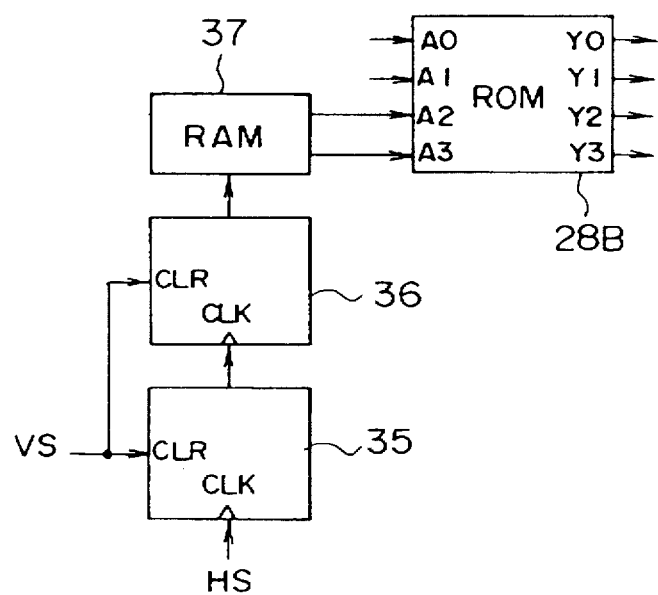
FIG. 21 is a diagram showing an arrangement of a control circuit for ROM in a gamma correction circuit according to a sixth preferred embodiment of the invention.

Unlike the first through the fifth embodiments, the ROM 28B in a sixth illustrative embodiment is provided with counters 35 and 36 and a RAM 37 as shown in FIG. 21.

Specifically, the difference from the third embodiment lies in that in this illustrative embodiment by setting the word length of the address of the ROM 28B to be 4 bits and by defining the two most significant bits of them, A2 and A3 as parameter inputs, the gamma correction tables are switched for each of the three areas into which a picture of one field is divided.

Assuming the number of the scanning lines for one field to be L and expressing the integral part of L/3 as "{L/3}", the counter 35 will be a scale-of-{L/3} counter. The overflow bits output from the counter 35 are counted by the counter 36 the content of which specifies the address of the RAM 37 from which data is supplied to the two most significant bits of the address of the ROM 28B.

The conversion table in the RAM 37 can be freely altered by means of a program. The counts of the counters 35 and 36 are cleared by the vertical synchronous signal vs. Also, to the clear inputs CLR of the counter 27C and the D type flip-flop 27B in FIG. 14, there is supplied the overflow bit from the counter 35 of FIG. 21 instead of the vertical synchronous signal VS.

Thus, in accordance with the sixth preferred embodiment of the invention, gamma correction can be made appropriately for each of the areas into which one field is divided by 3, so unevenness of the display quality can be eliminated.

The present invention includes a wide variety of other modifications. For example, in the second through sixth embodiments, though gamma correction data are written into a latch circuit in a non-display period every vertical synchronous signal, the write operation may be done in a display period. In the above described second and third embodiments, the write operation may be done only just after the power is turned on. And, in case of a color display, the above described gamma correction circuit may be provided for each color signal.

(7) Explanation of a Seventh Preferred Embodiment

Unlike the first through sixth embodiments, in a seventh embodiment, gamma correction circuit is applied to a data converter.

For example, a first liquid crystal driver for driving a LCD panel 43 as shown in FIG. 22 comprises a data converter 41 and a liquid crystal driving circuit 42.

Specifically, the data converter 41, which is an illustrative embodiment of the gamma correction circuit 201 of FIG. 3, comprises one of the first through sixth gamma correction circuit of the invention and corrects the luminance of the LCD panel 43 for effectuating liquid crystal display according to the input N-bit digital display data DI.

The liquid crystal driver circuit 42, which is an example of the signal processing means 202, D/A converts the gamma-corrected N-bit digital display data DI. For example, the liquid crystal driver circuit 42 comprises a D/A converter 42A, an amplifying and alternating circuit 42B and an analog driver 42C. The D/A converter 42A converts the digital display data DI into an analog display signal to output it to the amplifying and alternating circuit 42B, where the analog display signal is amplified and made AC. Then, the analog driver 42C amplifies and supplies the AC display signal to each electrode of the LCD panel 43.

Next, we discuss the operation of the first liquid crystal driver of the invention. When, for example, N-bit digital display data DI is gamma-corrected by the data converter 41 comprising a gamma correction circuit or one of the first through seventh embodiments of the invention, the gamma-corrected N-bit digital display data DI is D/A converted by the liquid crystal driver circuit 42. More specifically, N-bit digital display data DI is converted by the data converter 41 into (N+α)-bit data, which is then converted into an analog signal in the D/A converter 42A. The analog signal is amplified and made AC to be supplied to the analog driver 42C. Thus, the luminance of the LCD panel 43 is gamma-corrected.

As shown in FIG. 22, a liquid crystal driver according to a seventh preferred embodiment of the invention comprises a data converter 41 and a liquid crystal driver circuit 42, and the former comprises a first or a second gamma correction circuit of the invention.

It is possible to reduce the consumption of electric power and the scale of the circuit through the application of one of a first through sixth gamma correction circuits of the invention even when the number of pixels of the display is increased and data transfer frequency is raised.

This makes it possible to increase the display screen sizes and make LCD panels full color ones. Also, it leads to the reduction in the power consumption of information devices such as portable personal computers and word processors.

(8) Explanation of an Eighth Preferred Embodiment

Unlike the seventh embodiment, a gamma correction circuit is applied to a data converter of a digital driver in a eighth illustrative embodiment.

For example, as shown in FIG. 23, a second liquid crystal driver for driving an LCD panel 53 comprises a data converter 51 and a liquid crystal driver circuit 52.

Specifically, the data converter 51, which is an example of the gamma correction means 301 of FIG. 4, receives N-bit digital display data DI and on the basis thereof gamma-corrects the luminance of the LCD panel 53. The data converter 51 comprises one of the first through sixth gamma correction circuits of the invention.

The liquid crystal driver circuit 52, which is an illustrative embodiment of the signal processing means 302, receives gamma-corrected N-bit digital display data DI and samples and holds a reference voltage VR. For example, the liquid crystal driver circuit 52 comprises a reference voltage source 52A and a digital driver 52B. The reference voltage source 52A generates a plurality of reference voltages VR to supply them to the digital driver 52B. The digital driver 52B samples and holds a reference voltage on the basis of the input digital display data DI and amplifies and supplies it to each electrode of the LCD panel 53.

Next, we discuss the operation of the second liquid crystal driver of the invention. For example, when N-bit digital display data DI is gamma-corrected by the data converter 51 comprising a gamma correction circuit of one of the first through seventh embodiments of the invention, on the basis of the gamma-corrected N-bit digital display data DI the liquid crystal driver circuit 52 samples and holds a reference voltage VR. That is, as in the seventh embodiment, N-bit digital display data DI is converted into (N+α)-bit data, which is then supplied to the (N+α)-bit digital input of the digital driver 52B. In this case, the digital driver 52B operates as N-bit digital driver. Thus, the luminance of the LCD panel 53 is gamma-corrected as in the seventh embodiment.

As shown in FIG. 23, a liquid crystal driver according to a eighth preferred embodiment of the invention comprises a data converter 51 and a liquid crystal driver circuit 52 and the data converter 51 comprise a gamma correction circuit or one of a first through sixth embodiments of the invention.

Therefore, as in the seventh embodiment, the consumption of electric power can be reduced through the application of one of a first through sixth gamma correction circuits of the invention even when the number of pixels of the display is increased and data transfer frequency is raised.

This makes it possible to increase the display screen sizes and make LCD panels full color ones as in the seventh embodiment. Also, it leads to the reduction in the power consumption of information devices such as portable personal computers and word processors.

What is claimed is:

1. A gamma correction circuit for correcting digital input data for a purpose of causing display means manifesting nonlinearity in input-output characteristics thereof to emit light, comprising:
- a memory for storing correction data for the digital input data requiring gamma correction corresponding to the input-output characteristics of the display means; and
- a selector capable of selecting said correction data stored in said memory with respect to the digital input data in need of said gamma correction and emitting the digital input data not in need of said gamma correction directly in an unmodified form thereof as digital output data to the display means.

2. A gamma correction circuit of claim 1 wherein said digital input data requiring gamma correction correspond to a curved part in the input-output characteristics of the display means and said digital input data not requiring gamma correction correspond to a substantially straight part in the input-output characteristics of the display means.

3. A gamma correction circuit for correcting digital input data of N bits for a purpose of causing display means manifesting nonlinearity in input-output characteristics thereof to emit light, comprising:
- a first memory for storing first fixed correction data for correcting the digital input data corresponding to a substantially straight part of the input-output characteristics of the display means;
- a second memory for storing second correction data for correcting the digital input data corresponding to a curved part of the input-output characteristics of the display means;
- a first selector capable of selecting the digital input data corresponding to said substantially straight part of the input-output characteristics of the display means when the digital input data correspond to the substantially straight part of the input-output characteristics, and selecting and emitting as an output said second correction data stored in said second memory when the digital input data correspond to said curved part of the input-output characteristics of the display means; and
- a computing element capable of emitting to the display means first digital output data resulting from adding said first correction fixed data in said first memory to the digital input data emitted from said first selector with respect to said substantially straight part of the input-output characteristics of the display means, and emitting said second correction data in said second memory in an unmodified form thereof as second digital output data to the display means with respect to said curved part of the input-output characteristics.

4. A gamma correction circuit of claim 3 wherein the digital input data is composed of N bits and said second correction data is composed of N+α bits.

5. The gamma correction circuit of claim 3 further including a control signal generator for controlling said first selector, said control signal generator having:
- a latch circuit for holding said first and second correction data; and
- a comparator for comparing said first and second correction data and the N-bit digital display data.

6. The gamma correction circuit of claim 2 further including:
- a second selector for selecting said second correction data for correcting said curved part; and
- a second latch circuit for holding said second correction data.

7. A gamma correction circuit for correcting digital input data of N bits for a purpose of causing display means manifesting nonlinearity in input-output characteristics thereof to emit light, comprising:
- a memory for storing correction data corresponding to the digital input data;
- a latch circuit adapted to latch thereon said correction data stored in said memory;
- a control signal generating element for reading said correction data from said memory and causing said data to latch thereon; and
- a selector capable of selecting said correction data held in said latch circuit by said control signal generating element in accordance with the digital input data and emitting said selected correction data as digital output data.

8. The gamma correction circuit of claim 7 wherein said selector includes an asynchronous selector.

9. The gamma correction circuit of claim 7 wherein said selector is formed of CMOS logic gates.

10. The gamma correction circuit of claim 7 wherein said memory has a part of its addresses allocated for said correction data and a rest of said addresses allocated for parameters.

11. A gamma correction circuit of claim 7 wherein the digital input data is composed of N bits and said correction data stored in said memory is composed of N+α bits.

12. A liquid crystal driver for correcting digital input data for a purpose of causing liquid crystal display panel manifesting nonlinearity in input-output characteristics thereof to emit light, comprising:
- a memory for storing correction data for the digital input data requiring gamma correction corresponding to the input-output characteristics of the liquid crystal display panel; and
- a selector capable of selecting said correction data stored in said memory with respect to the digital input data if said gamma correction is needed and selecting the digital input data in an unmodified form thereof if said gamma correction is not needed, said selected data being digital output data supplied to the liquid crystal display panel.

13. A liquid crystal driver of claim 12 wherein said digital input data requiring gamma correction correspond to a curved part in the input-output characteristics of the liquid crystal display panel and said digital input data not requiring gamma correction correspond to a substantially straight part in the input-output characteristics of the liquid crystal display panel.

14. A liquid crystal driver of claim 12 further including means for converting said selected data into an analog signal.

15. A liquid crystal driver of claim 12 further including means for sampling and holding a reference voltage on the basis of said selected data.

16. A liquid crystal driver for correcting digital input data of N bits for a purpose of causing liquid crystal display panel manifesting nonlinearity in input-output characteristics thereof to emit light, comprising:
- a first memory for storing first fixed correction data for correcting the digital input data corresponding to a substantially straight part of the input-output characteristics of the liquid crystal display panel;

a second memory for storing second correction data for correcting the digital input data corresponding to a curved part of the input-output characteristics of the liquid crystal display panel;

a first selector capable of selecting the digital input data corresponding to said substantially straight part of the input-output characteristics of the liquid crystal display panel when the digital input data correspond to the substantially straight part of the input-output characteristics, and selecting and emitting as an output said second correction data stored in said second memory when the digital input data correspond to said curved part of the input-output characteristics of the liquid crystal display panel; and a computing element capable of emitting to the liquid crystal display panel first digital output data resulting from adding said first correction fixed data in said first memory to the digital input data emitted from said first selector with respect to said substantially straight part of the input-output characteristics of the liquid crystal display panel, and emitting said second correction data in said second memory in an unmodified form thereof as second digital output data to the liquid crystal display panel with respect to said curved part of the input-output characteristics.

17. The liquid crystal driver of claim 16 further including:

a second selector for selecting the second correction data for correcting said curved part; and a latch circuit for holding said second correction data.

18. The liquid crystal driver of claim 16 further including a control signal generator for controlling said first selector, said control signal generator having:

a latch circuit for holding said first and second correction data; and a comparator for comparing said first and second correction data and the N-bit digital display data.

19. A liquid crystal driver of claim 16 wherein the digital input data is composed of N bits and said second correction data is composed of N+α bits.

20. A liquid crystal driver of claim 16 further including means for converting said one of said first and second digital output data into an analog signal.

21. A liquid crystal driver of claim 16 further including means for sampling and holding a reference voltage on the basis of one of said first and second digital output data.

22. A liquid crystal driver for correcting digital input data of N bits for a purpose of causing liquid crystal display panel manifesting nonlinearity in input-output characteristics thereof to emit light, comprising:

a memory for storing correction data corresponding to the digital input data;

a latch circuit adapted to latch thereon said correction data stored in said memory;

a control signal generating element for reading said correction data from said memory and causing said data to latch thereon; and a selector capable of selecting said correction data held in said latch circuit by said control signal generating element in accordance with the digital input data and emitting said selected correction data as digital output data.

23. The liquid crystal driver of claim 22 wherein said selector includes an asynchronous selector.

24. The liquid crystal driver of claim 22 wherein said selector is formed of CMOS logic gates.

25. The liquid crystal driver of claim 22 wherein said memory has a part of its addresses allocated for said correction data and a rest of said addresses allocated for parameters.

26. A liquid crystal driver of claim 22 wherein the digital input data is composed of N bits and said correction data stored in said memory is composed of N+α bits.

27. A liquid crystal driver of claim 22 further including means for converting said selected correction data into an analog signal.

28. A liquid crystal driver of claim 22 further including means for sampling and holding a reference voltage on the basis of said selected correction data.

29. A method for gamma correcting digital input data for a purpose of causing display means manifesting nonlinearity in input-output characteristics thereof to emit light, said method comprising the steps of:

storing correction data for the digital input data requiring gamma correction corresponding to the input-output characteristics of the display means in a memory;

selecting said correction data stored in said memory with respect to the digital input data if said gamma correction is needed, and selecting the digital input data in an unmodified form if said gamma correction is not needed; and emitting said selected data to the display means.

30. A method for gamma correcting digital input data for a purpose of causing display means manifesting nonlinearity in input-output characteristics thereof to emit light, said method comprising the steps of:

storing first fixed correction data for correcting the digital input data corresponding to a substantially straight part of the input-output characteristics of the display means in a first memory;

storing second correction data for correcting the digital input data corresponding to a curved part of the input-output characteristics of the display means in a second memory;

selecting the digital input data corresponding to said substantially straight part of the input-output characteristics of the display means when the digital input data correspond to the substantially straight part of the input-output characteristics of the display means, and said second correction data stored in said second memory when the digital input data correspond to said curved part of the input-output characteristics of the display means;

sending said selected data to computing means;

generating first digital output data by adding said first correction fixed data in said first memory to the digital input data with respect to said substantially straight part of the input-output characteristics of the display means when said selected data sent from said first selector is the digital input data, and said second correction data in an unmodified form thereof as second digital output data when said second correction data when said selected data is said second correction data; and outputting said generated data to the display means.

31. A method for gamma correcting digital input data for a purpose of causing display means manifesting nonlinearity in input-output characteristics thereof to emit light, said method comprising the steps of:

storing correction data corresponding to the digital input data in a memory;

reading said correction data from said memory and generating a control signal for latching said correction data onto a latch circuit;

selecting said correction data held in said latch circuit in accordance with the digital input data; and outputting said selected correction data as digital output data.

32. A liquid crystal display comprising:

a liquid crystal display panel manifesting nonlinearity in input-output characteristics; and a liquid crystal driver for correcting digital input data for a purpose of causing said liquid crystal display panel to emit light;

said liquid crystal driver including:

a memory for storing correction data for said digital input data requiring gamma correction corresponding to said input-output characteristics of said liquid crystal display panel; and a selector capable of selecting said correction data stored in said memory with respect to said digital input data if said gamma correction is needed and selecting said digital input data in an unmodified form thereof if said gamma correction is not needed, said selected data being digital output data supplied to said liquid crystal display panel;

wherein said liquid crystal display panel is configured and arranged to emit light based on one of said input data in said unmodified form and said correction data.

33. A liquid crystal display comprising:

a liquid crystal display panel manifesting nonlinearity in input-output characteristics; and a liquid crystal driver for correcting digital input data of N bits for a purpose of causing said liquid crystal display panel to emit light;

said liquid crystal driver including:

a first memory for storing first fixed correction data for correcting said digital input data corresponding to a substantially straight part of said input-output characteristics of said liquid crystal display panel;

a second memory for storing second correction data for correcting said digital input data corresponding to a curved part of said input-output characteristics of said liquid crystal display panel;

a first selector capable of selecting said digital input data corresponding to said substantially straight part of said input-output characteristics of said liquid crystal display panel when said digital input data correspond to said substantially straight part of said input-output characteristics, and selecting and emitting as an output said second correction data stored in said second memory when said digital input data correspond to said curved part of said input-output characteristics of said liquid crystal display panel; and a computing element capable of emitting to said liquid crystal display panel first digital output data resulting from adding said first correction fixed data in said first memory to said digital input data emitted from said first selector with respect to said substantially straight part of said input-output characteristics of said liquid crystal display panel, and emitting said second correction data in said second memory in an unmodified form thereof as second digital output data to said liquid crystal display panel with respect to said curved part of said input-output characteristics;

wherein said liquid crystal display panel is configured and arranged to emit light based on one of said first and second digital output data.

34. A liquid crystal display comprising:

a liquid crystal display panel manifesting nonlinearity in input-output characteristics; and a liquid crystal driver for correcting digital input data of N bits for a purpose of causing said liquid crystal display panel to emit light;

said liquid crystal driver including:

a memory for storing correction data corresponding to said digital input data;

a latch circuit adapted to latch thereon said correction data stored in said memory;

a control signal generating element for reading said correction data from said memory and causing said data to latch thereon; and a selector capable of selecting said correction data held in said latch circuit by said control signal generating element in accordance with said digital input data and emitting said selected correction data as digital output data;

wherein said liquid crystal display panel is configured and arranged to emit light based on one of said correction data held in said latch circuit and said digital input data of N bits.

* * * * *

UNITED STATES PATENT AND TRADEMARK OFFICE
CERTIFICATE OF CORRECTION

PATENT NO. : 5,764,216

DATED : June 9, 1998

INVENTOR(S) : Tanaka et al.

It is certified that error appears in the above-identified patent and that said Letters Patent is hereby corrected as shown below:

On the title page

Under "[56] References Cited" insert

--FOREIGN DOCUMENTS-- and insert --5 232449 9/1993 Japan--

Column 8, line 3, delete "$\theta 0$" and insert --$\phi 0$-- therefor

Column 12, line 65, delete "245th" and insert --256th-- therefor

Column 15, line 24, delete "$\theta 0$" and insert --$\phi 0$-- therefor

UNITED STATES PATENT AND TRADEMARK OFFICE
CERTIFICATE OF CORRECTION

PATENT NO. : 5,764,216
DATED : June 9, 1998
INVENTOR(S) : Tanaka et al.

It is certified that error appears in the above-identified patent and that said Letters Patent is hereby corrected as shown below:

Column 20, line 1, delete "claim 2" and insert --claim 3-- therefor

Signed and Sealed this

Eighth Day of September, 1998

Attest:

BRUCE LEHMAN

Attesting Officer    Commissioner of Patents and Trademarks